(12) United States Patent
Xu et al.

(10) Patent No.: US 12,273,175 B2
(45) Date of Patent: Apr. 8, 2025

(54) BEAM QUALITY MEASUREMENTS IN WIRELESS NETWORKS

(71) Applicant: QUALCOMM Incorporated, San Diego, CA (US)

(72) Inventors: Huilin Xu, Temecula, CA (US); Alexandros Manolakos, Escondido, CA (US); Weimin Duan, San Diego, CA (US); June Namgoong, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 286 days.

(21) Appl. No.: 17/772,363

(22) PCT Filed: Nov. 25, 2020

(86) PCT No.: PCT/US2020/062255
§ 371 (c)(1),
(2) Date: Apr. 27, 2022

(87) PCT Pub. No.: WO2021/108572
PCT Pub. Date: Jun. 3, 2021

(65) Prior Publication Data
US 2022/0407581 A1    Dec. 22, 2022

(30) Foreign Application Priority Data

Nov. 25, 2019   (GR) .............................. 20190100530

(51) Int. Cl.
*H04B 7/06* (2006.01)
*H04B 7/08* (2006.01)
(Continued)

(52) U.S. Cl.
CPC ......... *H04B 7/0695* (2013.01); *H04B 7/0632* (2013.01); *H04B 7/088* (2013.01);
(Continued)

(58) Field of Classification Search
CPC .... H04B 7/0695; H04B 7/0632; H04B 7/088; H04W 72/21; H04W 24/08; H04W 72/046
See application file for complete search history.

(56) References Cited

U.S. PATENT DOCUMENTS 10,944,451 B2 *   3/2021   Lim ..................... H04B 7/0695
2018/0083679 A1   3/2018   Lim et al.
(Continued)

FOREIGN PATENT DOCUMENTS

CN    110247688 A      9/2019
EP    3748864 A1     12/2020
(Continued)

OTHER PUBLICATIONS

International Search Report and Written Opinion—PCT/US2020/062255—ISA/EPO—Feb. 18, 2021.

*Primary Examiner* — Chandrahas B Patel
(74) *Attorney, Agent, or Firm* — Loza & Loza, LLP

(57) ABSTRACT

Aspects relate to measuring downlink beam quality in the presence of self-interference when operating in a full duplex mode configured for concurrent transmission and reception within an overlapping bandwidth. A user equipment (UE) may communicate with a base station over one or more of a plurality of uplink beams and downlink beams. For each uplink beam, the UE may obtain beam quality measurements associated with each of the downlink beams to identify a set of usable downlink beams. The UE may further transmit a report to the base station indicating the set of usable downlink beams for at least one uplink beam.

29 Claims, 15 Drawing Sheets

(51) Int. Cl.
  *H04W 24/08* (2009.01)
  *H04W 72/044* (2023.01)
  *H04W 72/21* (2023.01)
(52) U.S. Cl.
  CPC ......... *H04W 24/08* (2013.01); *H04W 72/046* (2013.01); *H04W 72/21* (2023.01)

(56) References Cited

U.S. PATENT DOCUMENTS

2019/0089499 A1    3/2019  Nam et al.
2020/0220582 A1*   7/2020  Wu ..................... H04B 7/0408

FOREIGN PATENT DOCUMENTS

| WO | 2019060312 A1 | 3/2019 |
| WO | 2019164363 A1 | 8/2019 |
| WO | 2019170132 A1 | 9/2019 |

* cited by examiner

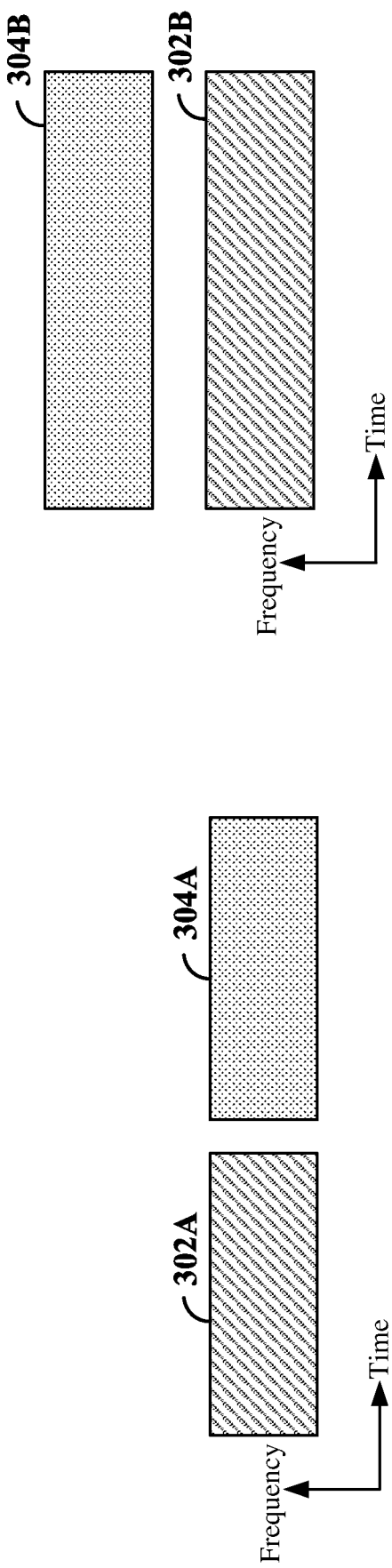
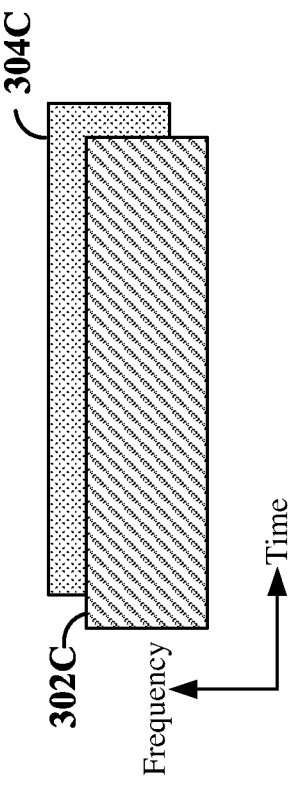
FIG. 3B
FIG. 3C
FIG. 3A

BEAM QUALITY MEASUREMENTS IN WIRELESS NETWORKS

CROSS-REFERENCE TO RELATED APPLICATION(S)

This application is the U.S. national stage of PCT patent application number PCT/US2020/062255 filed on Nov. 25, 2020 which claims priority to and the benefit of Greece patent application No. 20190100530 filed on Nov. 25, 2019, the entire content of which is incorporated herein by reference.

TECHNICAL FIELD

The technology discussed below relates generally to wireless communication systems, and more particularly, to measuring downlink beam quality in the presence of uplink self-interference.

INTRODUCTION

Wireless communication networks may utilize one or more duplexing mechanisms for communication over an air interface. Duplex refers to a point-to-point communication link where both endpoints can communicate with one another in both directions. Duplexing for wireless links is implemented by utilizing one or more of frequency division duplex (FDD), time division duplex (TDD), or full duplex. In the FDD mode, different frequency bandwidths are utilized for downlink communication from a base station to a user equipment (UE) and uplink communication from the UE to the base station. In the TDD mode, downlink and uplink communication occur on the same frequency bandwidth, but at different times, such that only one of the UE or base station can send information to the other at a time.

In the full duplex mode, both the UE and base station can simultaneously communicate with one another in the same frequency bandwidth. A full duplex channel generally relies on the physical isolation of a transmitter and receiver, and suitable interference cancellation technologies.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure as a prelude to the more detailed description that is presented later.

Various aspects of the disclosure relate to mechanisms for measuring downlink beam quality in the presence of uplink self-interference when operating in a full duplex mode. A user equipment (UE) may communicate with a base station over one or more of a plurality of uplink beams and downlink beams. For each uplink beam, the UE may obtain beam quality measurements associated with each of the downlink beams to identify a set of usable downlink beams. The UE may further transmit a report to the base station indicating the set of usable downlink beams for at least one uplink beam. Thus, in some aspects, an optimum set of downlink beams may be identified for each uplink beam, thereby improving communication performance between the UE and the base station.

In some examples, the UE may obtain beam quality measurements on a set of configured or activated downlink beams or a corresponding subset thereof. In some examples, each of the downlink beams may be identified based on quasi co-location (QCL) information indicating a spatial property of each of the downlink beams. The report transmitted to the base station may further include the respective QCL information for each of the downlink beams in the set of usable downlink beams. In some examples, for each uplink beam, the UE may further identify a set of non-usable downlink beams and include an indication of the set of non-usable downlink beams for the at least one uplink beam in the report.

In some examples, the beam quality measurements may include one or more of a reference signal received power (RSRP), a reference signal received quality (RSRQ), received signal strength indicator (RSSI), or a signal-to-interference-plus-noise ratio (SINR). In some examples, the SINR includes a self-interference contribution.

In some examples, for each uplink beam, the UE may compare the beam quality measurements associated with each of the downlink beams to a first threshold and identify the set of usable downlink beams for which the beam quality measurements exceed the first threshold. In some examples, the UE may identify the set of usable downlink beams as the downlink beams for which the beam quality measurements exceed the first threshold over a duration of time. In some examples, for each uplink beam, the UE may further compare the beam quality measurements associated with each of the downlink beams to a second threshold and identify the set of non-usable downlink beams for which the beam quality measurements are less than the second threshold. For example, the UE may receive a threshold amount and a hysteresis value from the base station and determine the first threshold and the second threshold based on the threshold amount and hysteresis value.

In some examples, a method for communication at a scheduled entity (e.g., a user equipment) may include communicating with a base station in a full duplex mode configured for concurrent transmission and reception within an overlapping bandwidth. The method may also include, for each of one or more uplink beams, obtaining beam quality measurements, where each beam quality measurement corresponds to a respective downlink beam of a plurality of downlink beams. The method may further include, for each of the one or more uplink beams, identifying a set of usable downlink beams of the plurality of downlink beams based on the beam quality measurements. In addition, the method may include transmitting a report to the base station indicating the set of usable downlink beams for at least one uplink beam of the one or more uplink beams.

In some examples, a scheduled entity (e.g., a user equipment) may include a transceiver, a memory, and a processor communicatively coupled to the transceiver and the memory. The processor may be configured to communicate with a base station in a full duplex mode configured for concurrent transmission and reception within an overlapping bandwidth. The processor may also be configured to, for each of one or more uplink beams, obtain beam quality measurements, where each beam quality measurement corresponds to a respective downlink beam of a plurality of downlink beams. The processor may further be configured to, for each of the one or more uplink beams, identify a set of usable downlink beams of the plurality of downlink beams based on the beam quality measurements. In addition the processor may be configured to transmit a report to the base station indicating the set of usable downlink beams for at least one uplink beam of the one or more uplink beams.

In some examples, a scheduled entity (e.g., a user equipment) may include means for communicating with a base station in a full duplex mode configured for concurrent transmission and reception within an overlapping bandwidth. The scheduled entity may also include means for obtaining, for each of one or more uplink beams, beam quality measurements, where each beam quality measurement corresponds to a respective downlink beam of a plurality of downlink beams. The scheduled entity may further include means for identifying, for each of the one or more uplink beams, a set of usable downlink beams of the plurality of downlink beams based on the beam quality measurements. In addition, the scheduled entity may include means for transmitting a report to the base station indicating the set of usable downlink beams for at least one uplink beam of the one or more uplink beams.

In some examples, an article of manufacture for use by a scheduled entity (e.g., a user equipment) includes a computer-readable medium having stored therein instructions executable by one or more processors of the scheduled entity to communicate with a base station in a full duplex mode configured for concurrent transmission and reception within an overlapping bandwidth. The computer-readable medium may also have stored therein instructions executable by one or more processors of the scheduled entity to, for each of one or more uplink beams, obtain beam quality measurements where each beam quality measurement corresponds to a respective downlink beam of a plurality of downlink beams. The computer-readable medium may further have stored therein instructions executable by one or more processors of the scheduled entity to, for each of the one or more uplink beams, identify a set of usable downlink beams of the plurality of downlink beams based on the beam quality measurements. In addition, the computer-readable medium may have stored therein instructions executable by one or more processors of the scheduled entity to transmit a report to the base station indicating the set of usable downlink beams for at least one uplink beam of the one or more uplink beams.

One or more of the following features may be applicable to one or more of the method, the apparatuses, and the computer-readable medium of the preceding paragraphs. A selected uplink beam of the one or more uplink beams may be identified. A downlink signal may be received from the base station on a usable downlink beam within the set of usable downlink beams corresponding to the selected uplink beam. The plurality of downlink beams may be selected from a set of configured downlink beams configured by the base station for communication with the scheduled entity. The plurality of downlink beams may be selected from a set of activated downlink beams within the set of configured downlink beams activated by the base station for communication with the scheduled entity. The plurality of downlink beams may be selected as a subset of the set of configured downlink beams. The plurality of downlink beams may be selected as a subset of the set of activated downlink beams.

In some examples, a method for communication at a scheduling entity (e.g., a base station) may include communicating with a user equipment (UE) in a full duplex mode configured for concurrent transmission and reception within an overlapping bandwidth, transmitting on a plurality of downlink beams to the UE to facilitate beam quality measurements on each of the plurality of downlink beams for each of one or more uplink beams, and receiving a report from the UE. The report may indicate a set of usable downlink beams of the plurality of downlink beams for at least one uplink beam of the one or more uplink beams based on the beam quality measurements. The method may further include identifying a selected uplink beam of the one or more uplink beams and transmitting a downlink signal to the UE on a usable downlink beam within the set of usable downlink beams corresponding to the selected uplink beam.

In some examples, a scheduling entity (e.g., a base station) may include a transceiver, a memory, and a processor communicatively coupled to the transceiver and the memory. The processor may be configured to communicate with a user equipment (UE) in a full duplex mode configured for concurrent transmission and reception within an overlapping bandwidth, transmit on a plurality of downlink beams to the UE to facilitate beam quality measurements on each of the plurality of downlink beams for each of one or more uplink beams, and receive a report from the UE. The report may indicate a set of usable downlink beams of the plurality of downlink beams for at least one uplink beam of the one or more uplink beams based on the beam quality measurements. The processor may also be configured to identify a selected uplink beam of the one or more uplink beams and transmit a downlink signal to the UE on a usable downlink beam within the set of usable downlink beams corresponding to the selected uplink beam.

In some examples, a scheduling entity (e.g., a base station) may include means for communicating with a user equipment (UE) in a full duplex mode configured for concurrent transmission and reception within an overlapping bandwidth, means for transmitting on a plurality of downlink beams to the UE to facilitate beam quality measurements on each of the plurality of downlink beams for each of one or more uplink beams, and means for receiving a report from the UE. The report may indicate a set of usable downlink beams of the plurality of downlink beams for at least one uplink beam of the one or more uplink beams based on the beam quality measurements. The scheduling entity may further include means for identifying a selected uplink beam of the one or more uplink beams and means for transmitting a downlink signal to the UE on a usable downlink beam within the set of usable downlink beams corresponding to the selected uplink beam.

In some examples, an article of manufacture for use by a scheduling entity (e.g., a base station) includes a computer-readable medium having stored therein instructions executable by one or more processors of the scheduling entity to communicate with a user equipment (UE) in a full duplex mode configured for concurrent transmission and reception within an overlapping bandwidth, transmit on a plurality of downlink beams to the UE to facilitate beam quality measurements on each of the plurality of downlink beams for each of one or more uplink beams, and receive a report from the UE. The report may indicate a set of usable downlink beams of the plurality of downlink beams for at least one uplink beam of the one or more uplink beams based on the beam quality measurements. The computer-readable medium may also have stored therein instructions executable by one or more processors of the scheduling entity to identify a selected uplink beam of the one or more uplink beams and transmit a downlink signal to the UE on a usable downlink beam within the set of usable downlink beams corresponding to the selected uplink beam.

One or more of the following features may be applicable to one or more of the method, the apparatuses, and the computer-readable medium of the preceding paragraphs. The downlink reference signals may be transmitted on each of the plurality of downlink beams. The plurality of downlink beams may include a set of configured downlink beams configured by the base station for communication with the UE. The plurality of downlink beams may include a set of activated downlink beams within the set of configured downlink beams activated by the base station for communication with the UE. The report may include respective quasi co-location information or a respective transmission configuration indication state, each indicating a respective spatial property for each respective downlink beam within the set of usable downlink beams for the at least one uplink beam. The spatial property may include at least one of a beam direction, a beam width, an associated downlink reference signal, or a combination thereof. The report may indicate the set of usable downlink beams and a respective set of non-usable downlink beams of the plurality of downlink beams for the at least one uplink beam, wherein the set of usable downlink beams and the set of non-usable downlink beams are non-overlapping.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIGS. 3A-3C are diagrams illustrating various duplexing modes in a radio access network.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
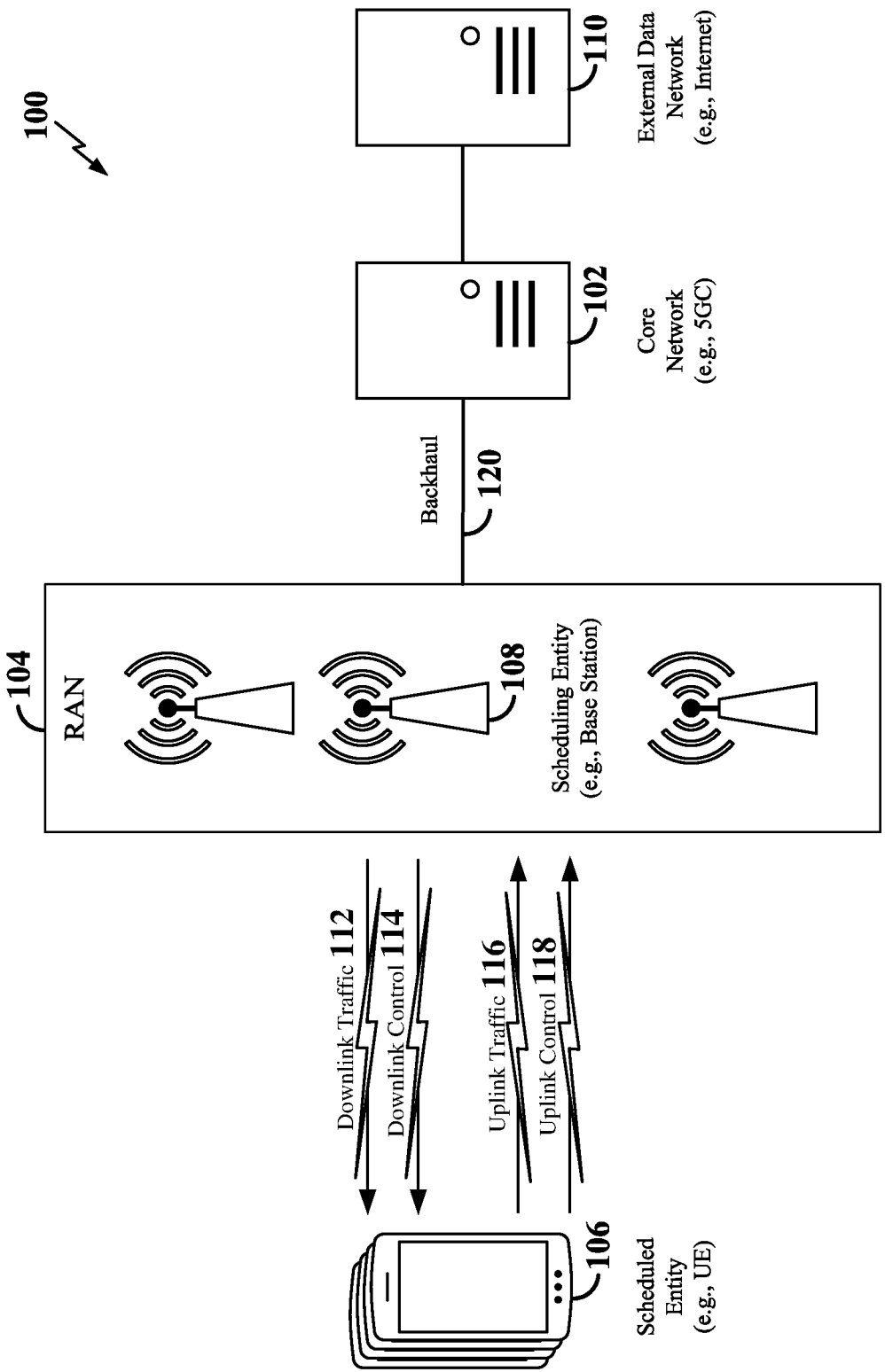
FIG. 1 is a schematic illustration of a wireless communication system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
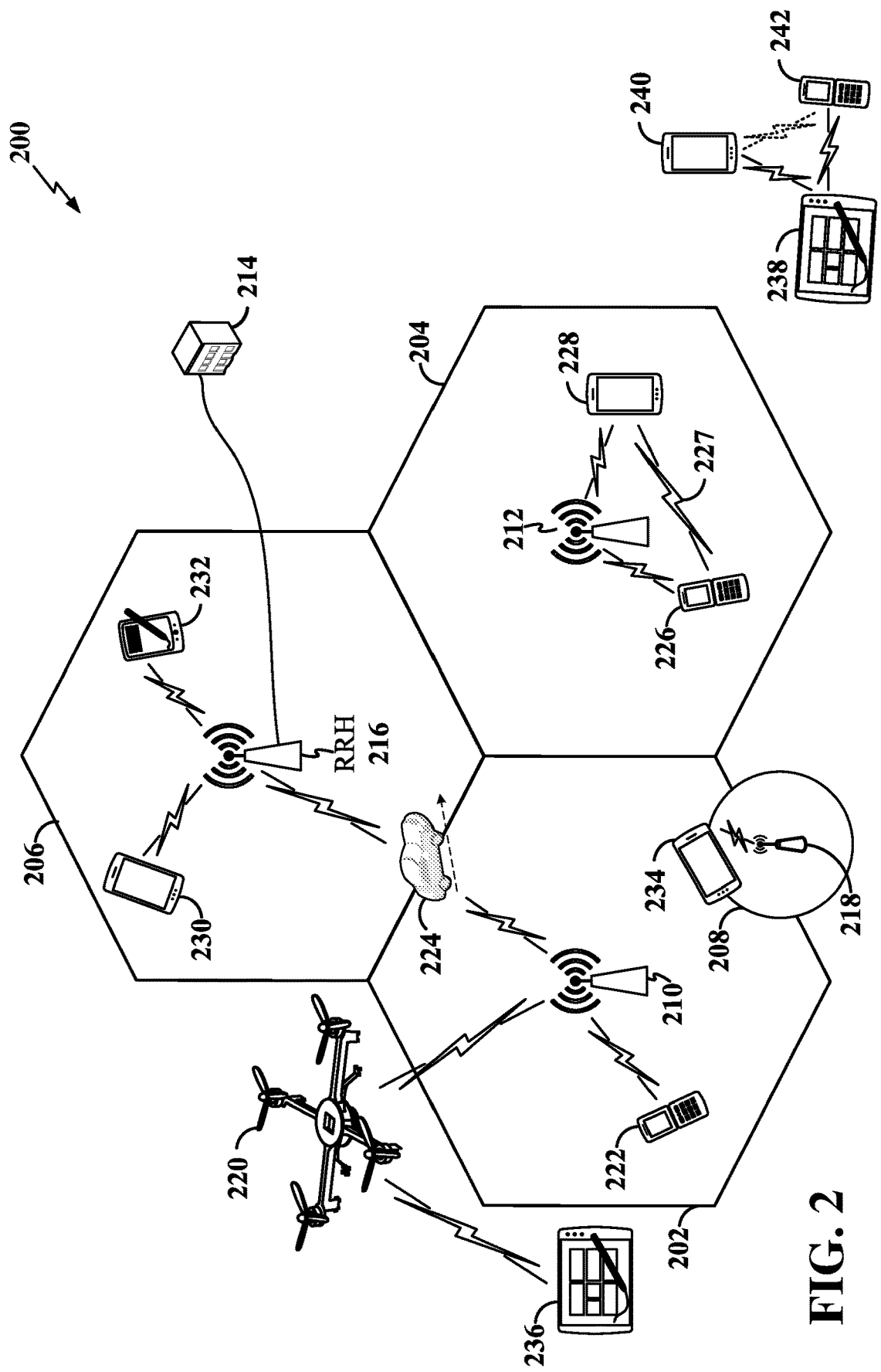
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210. In some examples, a UAV 220 may be configured to function as a BS (e.g., serving a UE 236). That is, in some examples, a cell may not necessarily be stationary, and the geographic area of the cell may move according to the location of a mobile base station such as a UAV 220.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the UE 238 (e.g., functioning as a scheduling entity). Thus, in a wireless communication system with scheduled access to time—frequency resources and having a cellular configuration, a P2P configuration, or a mesh configuration, a scheduling entity and one or more scheduled entities may communicate utilizing the scheduled resources. In some examples, the sidelink signals 227 include sidelink traffic and sidelink control.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing OFDM with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), OFDM, sparse code multiplexing (SCM), or other suitable multiplexing schemes.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still expected to access unlicensed spectrum, generally, any operator or device may gain access. Shared spectrum may fall between licensed and unlicensed spectrum, wherein technical rules or limitations may be used to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The air interface in the radio access network 200 may further utilize one or more duplexing schemes, such as time division duplex (TDD) (also known as half duplex), frequency division duplex (FDD), or full duplex. Referring now to FIGS. 3A, 3B, and 3C, various duplexing mechanisms are illustrated. FIG. 3A depicts a half duplex (or TDD) mode of communication between a UE and a base station. Half duplex (or TDD) means only one endpoint can send information to the other at a time. For example, in TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. Thus, as illustrated in FIG. 3A, downlink (DL) communications 302A are separated from uplink (UL) communications 304A in time.

FDD or full duplex means both endpoints can simultaneously communicate with one another. FIG. 3B depicts a FDD mode of communication between a UE and a base station, while FIG. 3C depicts a full duplex mode of communication between a UE and a base station. In the FDD mode, as shown in FIG. 3B, transmissions in different directions operate at different carrier frequencies. Thus, as illustrated in FIG. 3B, DL communications 302B are separated from UL communications 304B in frequency. In full duplex mode, as shown in FIG. 3C, transmissions in different directions operate at the same carrier frequency or within overlapping bandwidths. In the example shown in FIG. 3C, DL communications 302C overlap UL communications 304C in both time and frequency. Thus, when operating in a full duplex mode, the UE and base station are configured for concurrent transmission and reception within an overlapping bandwidth.

Various aspects of the present disclosure will be described with reference to an OFDM waveform, schematically illustrated in FIG. 4. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 4:
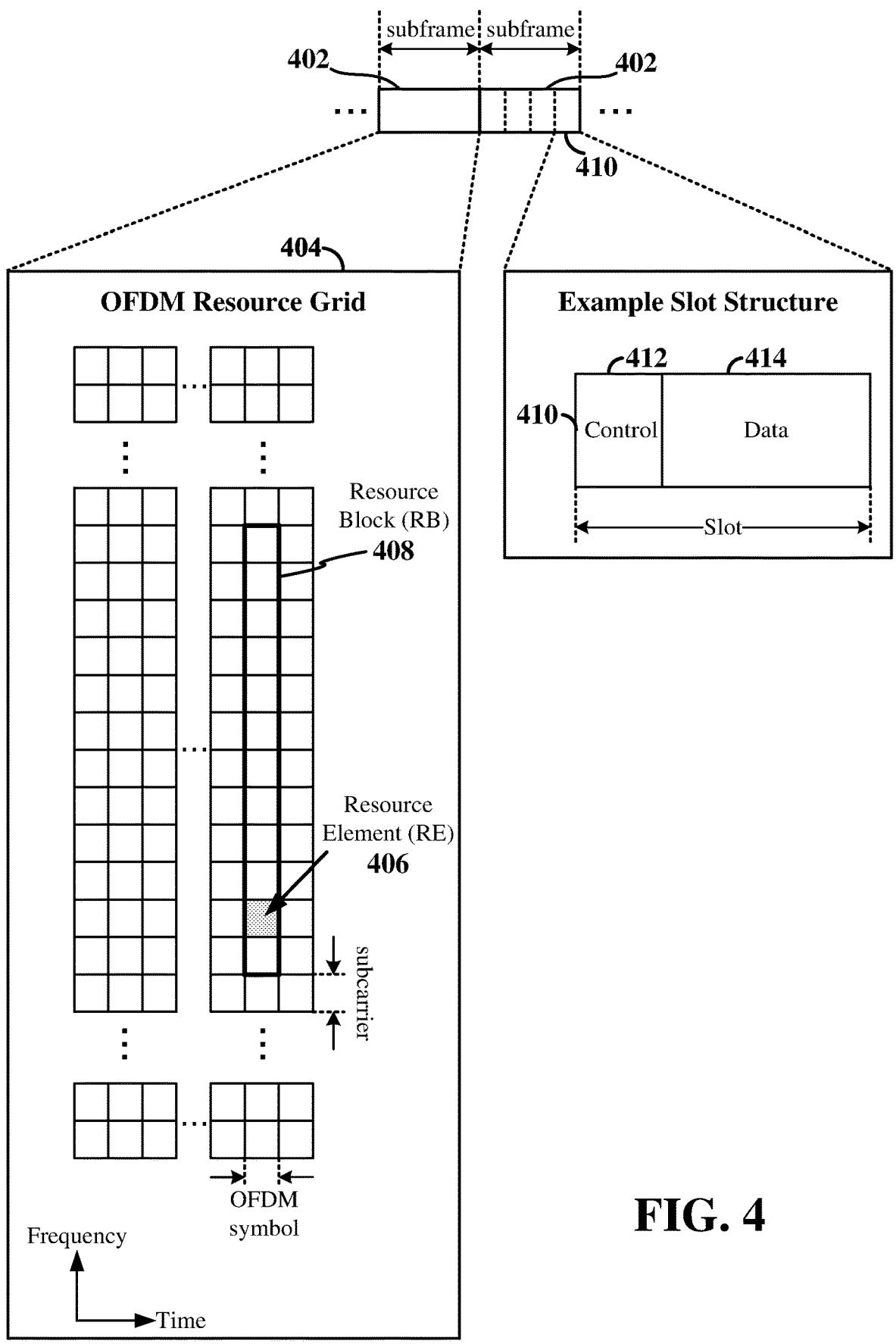
FIG. 4 is a schematic illustration of an organization of wireless resources in an air interface utilizing orthogonal frequency divisional multiplexing (OFDM).

Referring now to FIG. 4, an expanded view of an exemplary DL subframe 402 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 404 may be used to schematically represent time—frequency resources for a given antenna port. That is, in a multiple-input multiple-output (MIMO) implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time—frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain.

Scheduling of UEs (scheduled entities) for downlink or uplink transmissions typically involves scheduling one or more resource elements 406 within one or more sub-bands.

Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one to three OFDM symbols). These mini-slots may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels, and the data region 414 may carry data channels. Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry DL control information 114 including one or more DL control channels that generally carry information originating from higher layers, such as a physical broadcast channel (PBCH), a physical downlink control channel (PDCCH), etc., to one or more scheduled entities 106. The PDCCH may carry downlink control information (DCI) for one or more UEs in a cell. This can include, but is not limited to, power control commands, scheduling information, a grant, and/or an assignment of REs for DL and UL transmissions.

In addition, DL REs may be allocated to carry DL physical signals that generally do not carry information originating from higher layers. These DL physical signals may include a primary synchronization signal (PSS); a secondary synchronization signal (SSS); demodulation reference signals (DMRS); phase-tracking reference signals (PT-RS); channel-state information reference signals (CSI-RS); etc. The synchronization signals PSS and SSS (collectively referred to as synchronization signals (SS)), and in some examples, the PBCH, may be transmitted in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other nonlimiting examples may utilize greater or fewer than two synchronization signals; may include one or more supplemental channels in addition to the PBCH; may omit a PBCH; and/or may utilize non-consecutive symbols for an SS block, within the scope of the present disclosure.

In an UL transmission, a transmitting device (e.g., a scheduled entity 106) may utilize one or more REs 406 to carry UL control information 118 (UCI). The UCI can originate from higher layers via one or more UL control channels, such as a PUCCH, a physical random access channel (PRACH), etc., to the scheduling entity 108. Further, UL REs may carry UL physical signals that generally do not carry information originating from higher layers, such as demodulation reference signals (DMRS), phase-tracking reference signals (PT-RS), SRSs, etc. In some examples, the control information 118 may include a scheduling request (SR), i.e., a request for the scheduling entity 108 to schedule uplink transmissions. Here, in response to the SR transmitted on the control channel, the scheduling entity 108 may transmit downlink control information 114 that may schedule resources for uplink packet transmissions.

UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, one or more REs 406 (e.g., within the data region 414) may be allocated for user data traffic. Such traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry system information blocks (SIBs), carrying information that may enable access to a given cell.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 4 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 5:
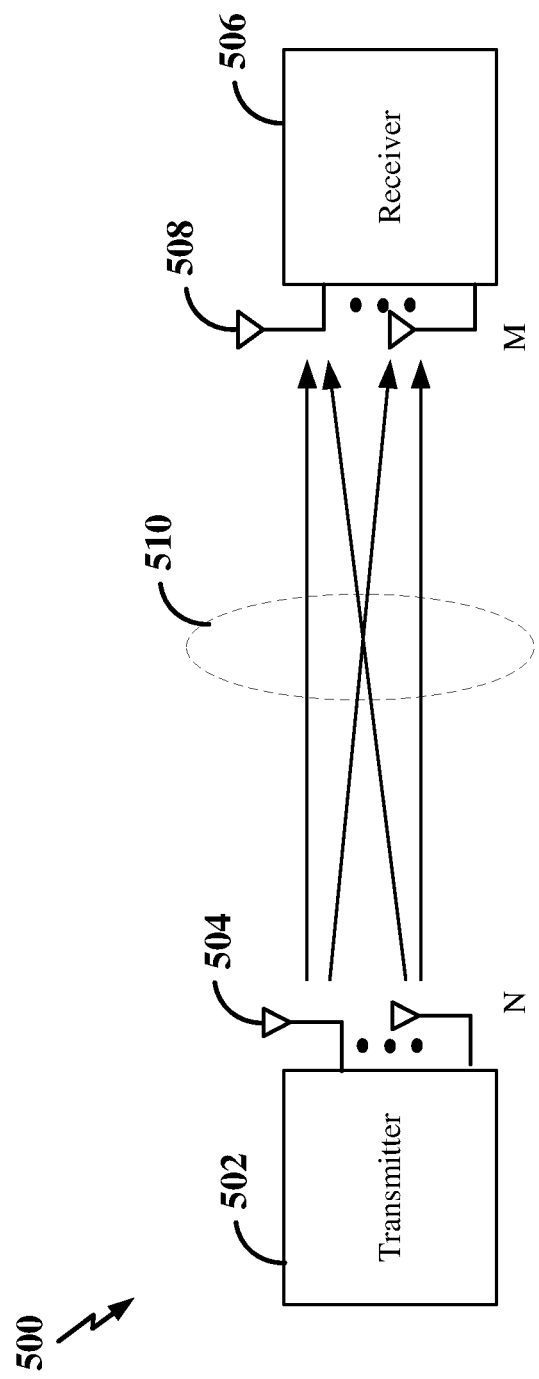
FIG. 5 is a block diagram illustrating a wireless communication system supporting multiple-input multiple-output (MIMO) communication.

In some examples, the scheduling entity and/or scheduled entity may be configured for beamforming and/or multiple-input multiple-output (MIMO) technology. FIG. 5 illustrates an example of a wireless communication system 500 supporting MIMO and beamforming technology. In a MIMO system, a transmitter 502 includes multiple transmit antennas 504 (e.g., N transmit antennas) and a receiver 506 includes multiple receive antennas 508 (e.g., M receive antennas). Thus, there are N×M signal paths 510 from the transmit antennas 504 to the receive antennas 508. Each of the transmitter 502 and the receiver 506 may be implemented, for example, within a scheduled entity, a scheduling entity or other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of a MIMO system is limited by the number of transmit or receive antennas 504 or 508, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 5, a rank-2 spatial multiplexing transmission on a 2×2 MIMO antenna configuration will transmit one data stream from each transmit antenna 504. Each data stream reaches each receive antenna 508 along a different signal path 510. The receiver 506 may then reconstruct the data streams using the received signals from each receive antenna 508.

Beamforming is a signal processing technique that may be used at the transmitter 502 or receiver 506 to shape or steer an antenna beam (e.g., a transmit beam or receive beam) along a spatial path between the transmitter 502 and the receiver 506. Beamforming may be achieved by combining the signals communicated via antennas 504 or 508 (e.g., antenna elements of an antenna array module) such that some of the signals experience constructive interference while others experience destructive interference. To create the desired constructive/destructive interference, the transmitter 502 or receiver 506 may apply amplitude and/or phase offsets to signals transmitted or received from each of the antennas 504 or 508 associated with the transmitter 502 or receiver 506.

In 5G-NR systems, particularly for above 6 GHz or mmWave systems, beamformed signals may be utilized for most downlink channels, including the physical downlink control channel (PDCCH) and physical downlink shared channel (PDSCH). In addition, broadcast control information, such as the master system information block (MSIB), slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH). However, it should be understood that beamformed signals may also be utilized by enhanced mobile broadband (eMBB) gNBs for sub 6 GHz systems.

Figure 6:
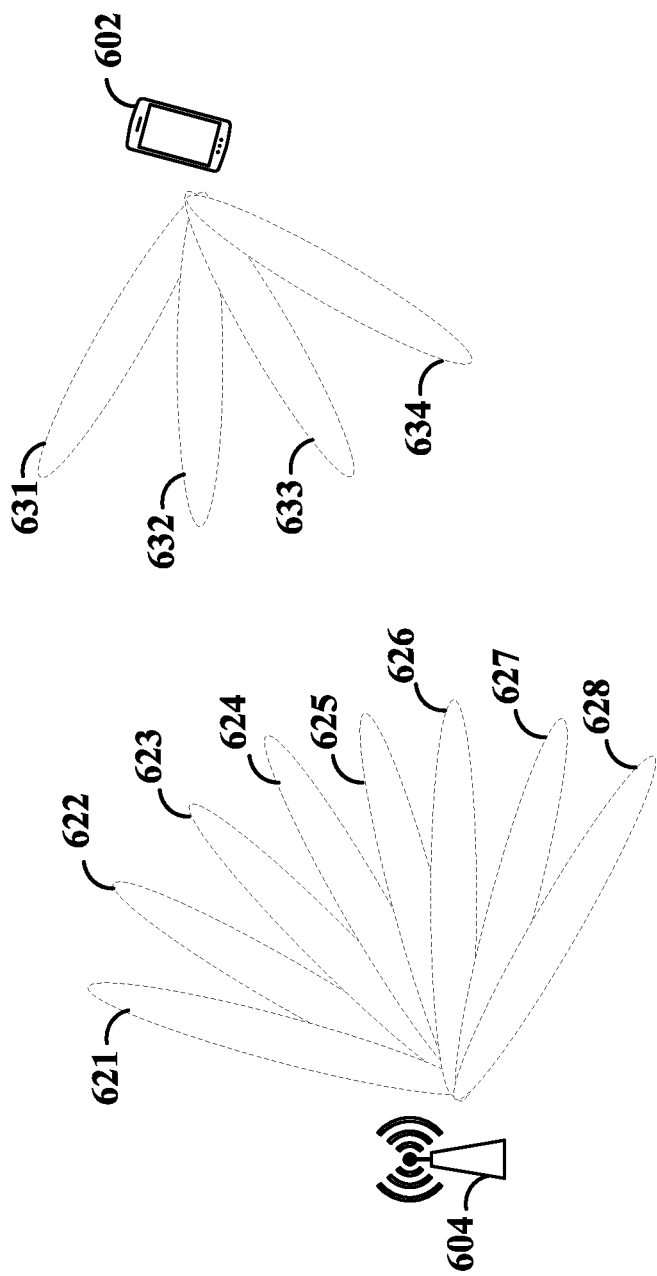
FIG. 6 is a diagram illustrating beamforming in a wireless communication system.

FIG. 6 is a diagram illustrating communication between a base station (BS) 604, such as a gNB, and a UE 602 using beamformed signals according to some aspects of the disclosure. The BS 604 may be any of the base stations or scheduling entities illustrated in any of FIGS. 1, 2, 5, 8, and 9. The UE 602 may be any of the UEs or scheduled entities illustrated in any of FIGS. 1, 2, 5, 8, and 10.

In 5G-NR, control and data may be communicated between the UE 602 and the BS 604 over a plurality of different beams/paths, each having a different spatial relationship with other beams/paths. For example, the BS 604 may communicate with the UE 602 utilizing one or more downlink beams and the UE 602 may communicate with the BS 604 utilizing one or more uplink beams. In some examples, the BS 604 and UE 602 may communicate over a beam pair link (BPL) that includes a pair of downlink/uplink beams (e.g., a downlink beam of the BS 604 and an uplink beam of the UE 602). Each of the downlink beams and uplink beams may be selected from a corresponding set of beams. In the example shown in FIG. 6, the downlink beam set contains eight different beams 621, 622, 623, 624, 625, 626, 627, 628, each associated with a different spatial beam direction. In addition, the uplink beam set contains four different beams 631, 632, 633, and 634, each associated with a different spatial beam direction. It should be noted that while some beams are illustrated as adjacent to one another, such an arrangement may be different in different aspects. In some examples, beams transmitted during the same symbol may not be adjacent to one another. In some examples, the BS 604 and/or UE 602 may transmit more or less beams distributed in all directions (e.g., 360 degrees).

In some examples, the BS 604 may be configured to sweep or transmit each of the downlink beams 621, 622, 623, 624, 625, 626, 627, 628 during a synchronization slot. For example, the BS 604 may transmit a reference signal, such as an SSB or CSI-RS, on each downlink beam in the different beam directions during the synchronization slot.

Transmission of the downlink reference signals may occur periodically (e.g., as configured via radio resource control (RRC) signaling by the gNB), semi-persistently (e.g., as configured via RRC signaling and activated/deactivated via medium access control—control element (MAC-CE) signaling by the gNB), or aperiodically (e.g., as triggered by the gNB via downlink control information (DCI)).

The UE 602 utilizes the received downlink reference signals to identify the downlink beams and perform downlink beam quality measurements, such as received power measurements (e.g., RSRP) and/or received quality measurements (e.g., RSRQ), on the downlink reference signals. The UE 602 may further perform additional beam quality measurements, such as signal strength (e.g., received signal strength indicator (RSSI)) or interference/noise (e.g., SINR) measurements on the downlink reference signals received on one or more of the downlink beams.

The UE 602 may then transmit a beam measurement report including the respective beam index and RSRP or other beam quality measurement(s) of each downlink beam 621-628. The BS 604 may then determine the downlink beam (e.g., downlink beam 624) on which to transmit unicast downlink control information and/or user data traffic to the UE 602 with the highest quality from the beam measurement report. Transmission of the beam measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

In other examples, when the channel is reciprocal (e.g., the downlink and uplink channel qualities are the same), the BS 604 may derive the downlink beam. Derivation can be based on uplink measurements, such as by measuring the received power, quality, or other variable of a respective sounding reference signal (SRS) or other uplink reference signal transmitted on each uplink beam 631, 632, 633, and 634 in the set of uplink beams. In some examples, the BS 604 may select not only the downlink beam, but also the uplink beam (e.g., beam 633) as part of the BPL based on the received beam measurement report and/or uplink measurements. In other examples, the UE 602 may select the uplink beam (e.g., beam 633) based on the downlink measurements or other factors. For example, the UE 602 may be configured for uplink non-codebook based MIMO or uplink beam management.

In some examples, the BS 604 may pre-configure each of the reference signals (e.g., downlink reference signals and uplink reference signals) to be communicated between the UE 602 and the BS 604 with particular time—frequency resources and particular beams/paths and provide configuration information for each of the reference signals to the UE 602 via, for example, RRC signaling. In some examples, the configuration information may include a transmission configuration indicator (TCI) state that indicates quasi co-location (QCL) information (e.g., QCL Type and time—frequency resources) of the reference signal. Examples of QCL types may include one or more of Doppler shift, Doppler spread, average delay, delay spread, and a spatial RX parameter (e.g., spatial property of the beam). The spatial property of the beam may include, for example, at least one of a beam direction, a beam width, or an associated downlink reference signal (e.g., a spatial QCL relationship with a downlink reference signal, such as a SSB or CSI-RS). In some examples, each of the reference signals may be pre-configured with the same or different TCI states (e.g., for downlink reference signals) or spatial QCL relationships (e.g., for uplink reference signals) with respect to the spatial beams or BPLs on which the reference signals are transmitted. Thus, each of the reference signals may be communicated on the same or different beams or BPLs.

When operating in a TDD (half-duplex) or FDD mode, the selection of the downlink beam based on downlink and/or uplink measurements taken in isolation (e.g., without consideration of communications occurring in the reverse direction) may result in an optimal downlink beam for communication between the UE 602 and the BS 604. However, when operating in full duplex mode, device self-interference due to concurrent transmission and reception in an overlapping bandwidth may severely degrade the performance of UE reception via the selected downlink beam. Self-interference may result from local reflection and refraction of power from the transmit antenna to the receive antenna and/or cross-talk between the transmit chain and receive chain. Although various mechanisms may be utilized to reduce self-interference, such as RF circuit isolation between the transmit chain and the receive chain, improved antenna design to avoid backflow of power from the transmit antenna to the receive antenna, and analog/digital self-interference cancellation to remove transmit leakage current, received downlink transmissions on the selected downlink beam may be affected by the presence of strong self-interference from concurrent uplink transmissions.

Therefore, in various aspects of the disclosure, downlink beam selection may further take into account the self-interference resulting from concurrent uplink transmissions. In some examples, the UE 602 may measure downlink beam quality in the presence of self-interference when operating in a full duplex mode to identify a set of usable downlink beams for each uplink beam. For example, for each uplink beam 631-634, the UE may obtain beam quality measurements associated with each of the downlink beams 621-628 to identify the set of usable downlink beams. In some examples, the downlink beams 621-628 on which beam quality measurements are obtained may include a set of configured or activated downlink beams or a corresponding subset thereof. The beam quality measurements may include one or more of RSRP, RSRQ, RSSI, and SINR. In some examples, the SINR may include a self-interference contribution.

The UE 602 may then transmit a report to the BS 604 indicating the set of usable downlink beams for one or more of the uplink beams. In some examples, the report may include the beam measurement report transmitted from the UE 602 to the BS 604. In other examples, the report may include a separate report generated and transmitted from the UE 602 to the BS 604. In some examples, the report transmitted to the BS 604 may further include the respective QCL information for each of the downlink beams in the set of usable downlink beams. In some examples, the UE 602 may further identify a set of non-usable downlink beams for each uplink beam and include the set of non-usable downlink beams for the at least one uplink beam in the report.

The UE 602 may determine the set of usable downlink beams and the set of non-usable downlink beams by comparing the beam quality measurements to one or more thresholds. For example, for each uplink beam, the UE 602 may compare the beam quality measurements associated with each of the downlink beams to a first threshold and identify the set of usable downlink beams for which the beam quality measurements exceed the first threshold. As another example, for each uplink beam, the UE 602 may further compare the beam quality measurements associated with each of the downlink beams to a second threshold and identify the set of non-usable downlink beams for which the beam quality measurements are less than the second threshold. The UE 602 may receive a threshold amount and a hysteresis value from the BS 604 and determine the first threshold and the second threshold based on the threshold amount and hysteresis value. For example, the UE 602 may determine the first threshold by adding the hysteresis value to the threshold amount and the second threshold by subtracting the hysteresis value from the threshold amount.

Figure 7:
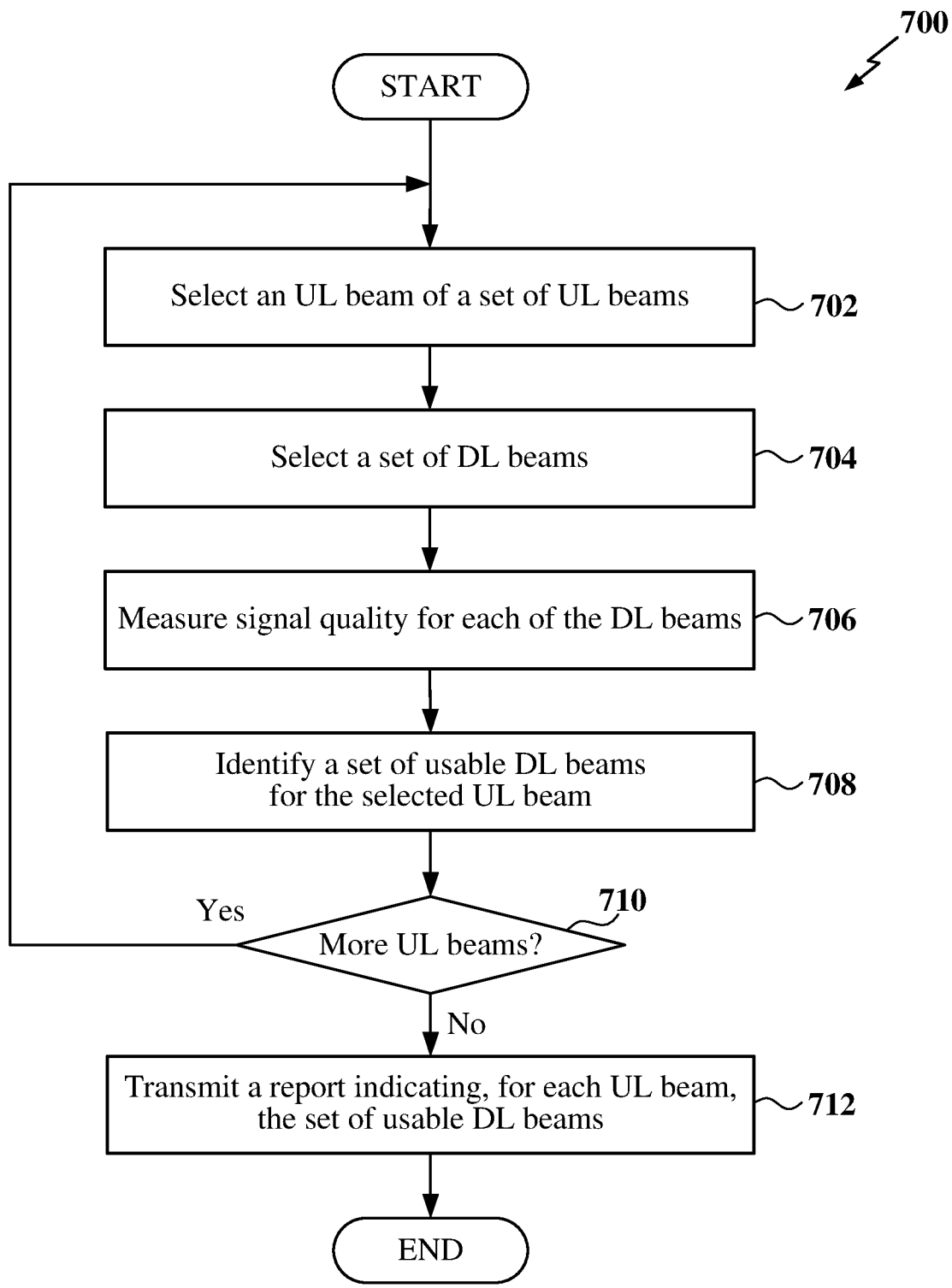
FIG. 7 is a flow chart illustrating an exemplary process for a user equipment to identify downlink beams per uplink beam when operating in full duplex mode.

FIG. 7 is a flow chart illustrating an exemplary process 700 for a UE to identify usable downlink beams per uplink beam when operating in full duplex mode as described above in conjunction with FIG. 6. As described below, some or all illustrated features may be omitted in a particular implementation within the scope of the present disclosure, and some illustrated features may not be required for implementation of all embodiments. In some examples, the process 700 may be carried out by a scheduled entity (e.g., a UE) 1000 illustrated in FIG. 10. In some examples, the process 700 may be carried out by any suitable apparatus or means for carrying out the functions or algorithm described below.

At block 702, a UE selects one uplink (UL) beam from a set of UL beams that the UE may use to communicate with a base station (BS) during a full duplex mode of operation.

At block 704, the UE selects a set of candidate downlink (DL) beams that the UE may use with the selected UL beam during the full duplex communication. For example, the UE may determine which DL beams are currently activated for use by the UE.

At block 706, the UE measures signal quality for each of the candidate DL beams. For example, as discussed above, the UE may measure the beam quality of each activated DL beams. These beam quality measurements may include one or more of an RSRP measurement, an RSRQ measurement, an RSSI measurement, an SINR measurement, or a combination thereof. In some examples, the measured SINR may include a self-interference contribution.

At block 708, the UE identifies a set of usable DL beams that the UE may use with the selected UL beam during the full duplex mode of operation. For example, as discussed above, the UE may compare the beam quality measurements associated with each of the DL beams to a threshold and identify the beams for which the beam quality measurements exceed the threshold as the usable DL beams.

At block 710, the UE determines whether there are any more UL beams for which a determination of a set of usable DL beams is to be made. If so, the process 700 returns back to block 702 where another UL beam is selected and the operations of blocks 704-708 are performed for that UL beam to identify the set of usable DL beams for that UL beam. This process is repeated for each UL beam that may be used by the UE for the full duplex communication.

Once all of the sets of useable DL beams are determined for each UL beam, at block 712, the UE transmits a report to the BS. This report indicates, for each UL beam, the corresponding set of usable DL beams.

Figure 8:
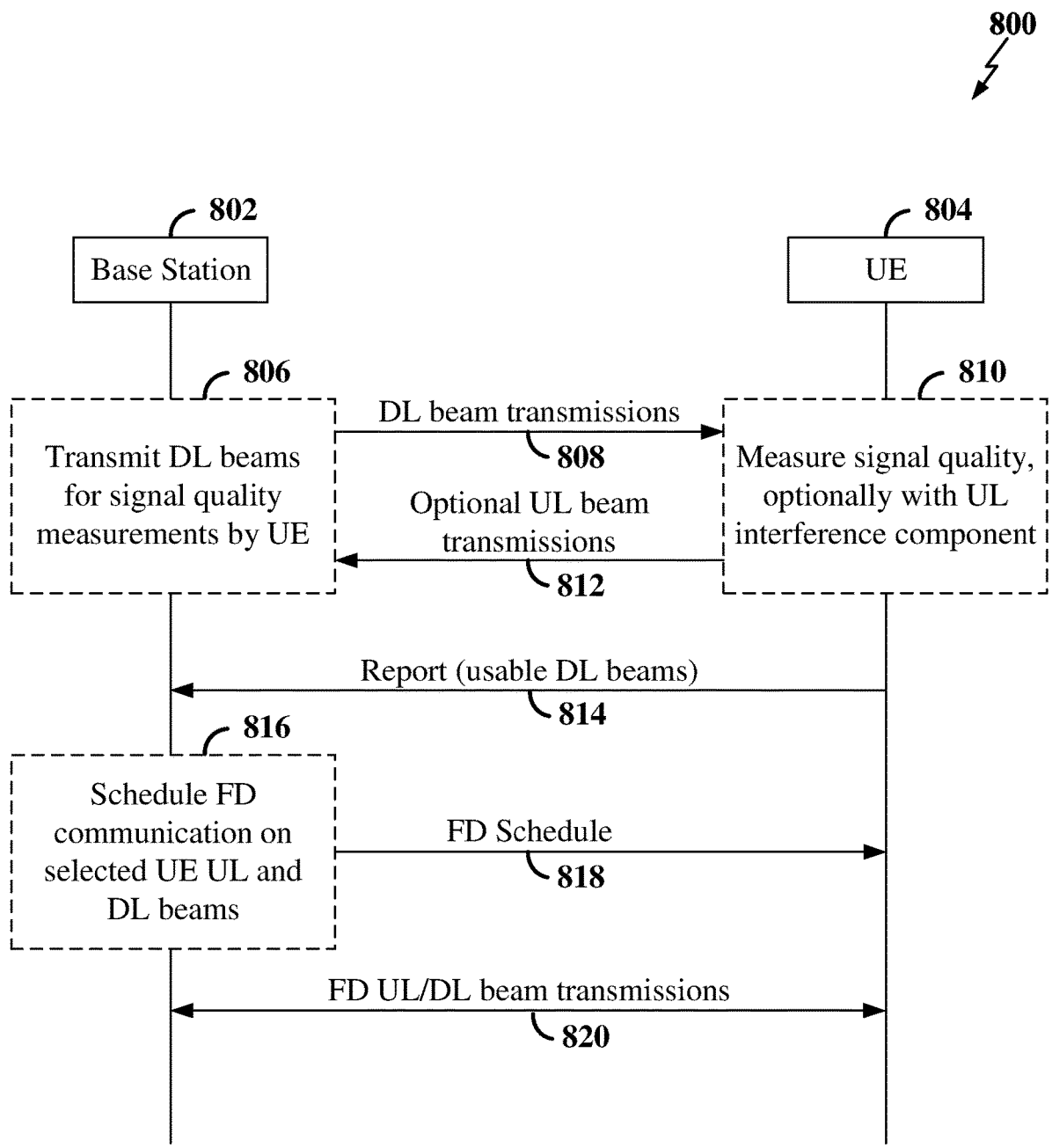
FIG. 8 is a signaling diagram illustrating exemplary signaling associated with identifying downlink beams per uplink beam for a full duplex mode.

FIG. 8 is a signaling diagram 800 illustrating an example of signaling associated with identifying downlink beams per uplink beam for full duplex communication in a wireless communication system including a base station (BS) 802 and a UE 804. In some examples, the BS 802 may correspond to any of the base stations or scheduling entities shown in any of FIGS. 1, 2, 5, 6, and 9. In some examples, the UE 804 may correspond to any of the UEs or scheduled entities shown in any of FIGS. 1, 2, 5, 6, and 10.

At step 806 of FIG. 8, the BS 802 transmits several (DL) beams 808 to the UE 804 to enable the UE 804 to conduct signal quality measurements for each of the DL beams 808.

At step 810, the UE 804 conducts signal quality measurements for each of the DL beams 808. In some examples, the UE 804 may conduct the signal quality measurements for the DL beams 808 while transmitting an UL beam 812. In this way, the DL measurements may take self-interference (SI) associated with full duplex (FD) communication into account.

At step 814, the UE 804 transmit a report to the BS 802 based on the measurements of step 810. As discussed herein, the report may indicate, for each of a plurality of UL beams, a corresponding set of usable DL beams.

At step 816, the BS 802 schedules an FD communication with the UE 804 and sends a corresponding schedule 818 to the UE 804 that indicates the UL beam and the DL the UE is to use for the FD communication. As discussed herein, upon selecting an UL beam for the UE, the BS 802 may select the DL beam based on the set of usable DL beams associated with that UL beam.

At step 820, the BS 802 and the UE 804 conduct the FD communication. Here, the UE 804 uses the specified UL beam and DL beam for the FD communication.

Figure 9:
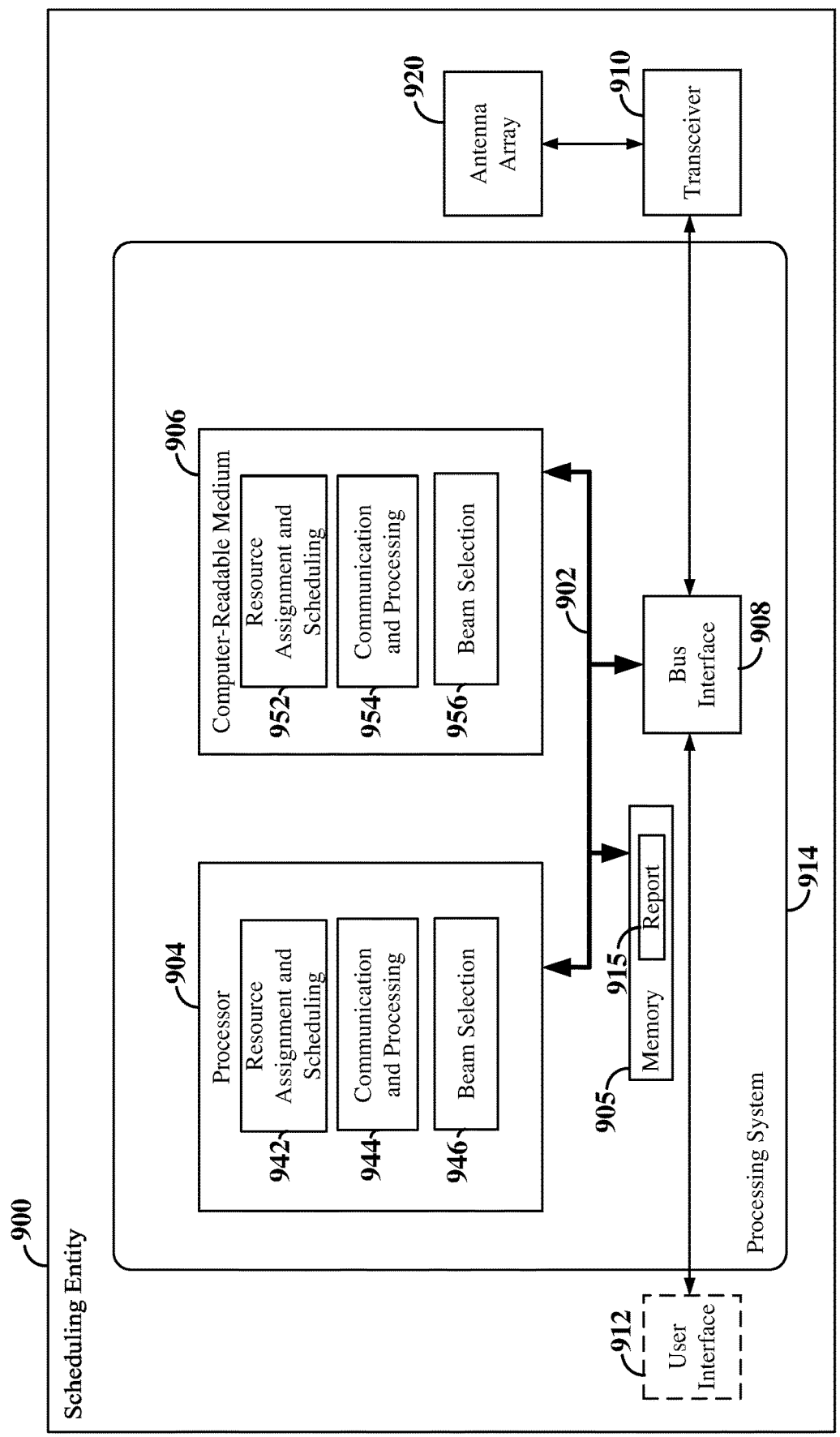
FIG. 9 is a block diagram illustrating an example of a hardware implementation for a scheduling entity employing a processing system.

FIG. 9 is a conceptual diagram illustrating an example of a hardware implementation for an exemplary scheduling entity 900 employing a processing system 914. For example, the scheduling entity 900 may be a base station as illustrated in any of FIGS. 1, 2, 5, 6, and 8.

The scheduling entity 900 may be implemented with a processing system 914 that includes one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 900 may be configured to perform any one or more of the functions described herein. That is, the processor 904, as utilized in a scheduling entity 900, may be used to implement any one or more of the processes described below. The processor 904 may in some instances be implemented via a baseband or modem chip and in other implementations, the processor 904 may itself comprise a number of devices distinct and different from a baseband or modem chip (e.g., in such scenarios is may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 914 may be implemented with a bus architecture, represented generally by the bus 902. The bus 902 may include any number of interconnecting buses and bridges depending on the specific application of the processing system 914 and the overall design constraints. The bus 902 communicatively couples together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further. A bus interface 908 provides an interface between the bus 902 and a transceiver 910. The transceiver 910 provides a means for communicating with various other apparatus over a transmission medium (e.g., air interface). Depending upon the nature of the apparatus, a user interface 912 (e.g., keypad, display, speaker, microphone, joystick) may also be provided. Of course, such a user interface 912 is optional, and may be omitted in some examples, such as a base station.

The processor 904 is responsible for managing the bus 902 and general processing, including the execution of software stored on the computer-readable medium 906. The software, when executed by the processor 904, causes the processing system 914 to perform the various functions described below for any particular apparatus. The computer-readable medium 906 and the memory 905 may also be used for storing data that is manipulated by the processor 904 when executing software.

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 906.

The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 906 may reside in the processing system 914, external to the processing system 914, or distributed across multiple entities including the processing system 914. The computer-readable medium 906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 904 may include circuitry configured for various functions. For example, the processor 904 may include resource assignment and scheduling circuitry 942, configured to generate, schedule, and modify a resource assignment or grant of time—frequency resources (e.g., a set of one or more resource elements). For example, the resource assignment and scheduling circuitry 942 may schedule time—frequency resources within a plurality of TDD, FDD, or full duplex subframes, slots, and/or mini-slots to carry user data traffic and/or control information to and/or from multiple UEs (scheduled entities).

In some examples, the resource assignment and scheduling circuitry 942 may be configured to schedule resources (aperiodic, semi-persistent, or with a pre-determined periodicity) for the transmission of one or more downlink and/or uplink reference signals (e.g., SSB, CSI-RS, SRS, etc.). For example, the resource assignment and scheduling circuitry 942 may be configured to pre-configure each of the reference signals with particular time—frequency resources and particular beams/paths. In some examples, the configuration information may include a TCI state or spatial QCL relationship that indicates the spatial beams or BPLs on which the reference signals are transmitted. In some examples, each of the reference signals may be communicated on one or more of the beams. The resource assignment and scheduling circuitry 942 may further be configured to execute resource assignment and scheduling software 952 stored on the computer-readable medium 906 to implement one or more of the functions described herein.

The processor 904 may further include communication and processing circuitry 944, configured to communicate with one or more scheduled entities (e.g., UEs). The communication and processing circuitry 944 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 944 may be configured to generate and transmit downlink user data traffic and downlink control channels within one or more subframes, slots, and/or mini-slots in accordance with the resources assigned to the downlink user data traffic and/or downlink control information by the resource assignment and scheduling circuitry 942. In addition, the communication and processing circuitry 944 may be configured to receive and process uplink user data traffic and uplink control channels within one or more subframes, slots, and/or mini-slots in accordance with the resources assigned to the uplink user data traffic and/or uplink control information by the resource assignment and scheduling circuitry 942. In some examples, the communication and processing circuitry 944 may be configured to communicate with a scheduled entity (e.g., a UE) when the UE is operating in a full duplex mode configured for concurrent transmission and reception within an overlapping bandwidth.

In some examples, the communication and processing circuitry 944 may be configured to transmit beamformed signals via the transceiver 910 and an antenna array 1420. In some examples, the communication and processing circuitry 944 may be configured to transmit downlink reference signals (e.g., SSB and/or CSI-RS) on one or more downlink beams to a UE. In some examples, the communication and processing circuitry 944 may be configured to transmit downlink reference signals on a set of configured downlink beams configured for communication of a PDSCH including a PDSCH DMRS to the UE. For example, the set of configured downlink beams may be indicated by a set of configured spatial Rx parameters for the PDSCH. In some examples, the communication and processing circuitry 944 may be configured to transmit downlink reference signals on a set of activated downlink beams of the configured downlink beams activated for communication of the PDSCH. For example, the set of activated downlink beams may be indicated by a set of configured spatial Rx parameters for the PDSCH. In this example, the resource assignment and scheduling circuitry 942 may be configured to schedule resources for the transmission of downlink reference signals on the set of configured or activated downlink beams.

In some examples, the communication and processing circuitry 944 may be configured to receive beamformed signals via the transceiver 910 and the antenna array 1420. In some examples, the communication and processing circuitry 944 may further be configured to receive a respective SRS transmitted by the UE on one or more uplink beams. In some examples, the received SRS(s) may indicate to the scheduling entity 900 the uplink beam on which the UE may transmit uplink user data traffic and/or uplink control information. For example, the scheduling entity 900 may be configured to identify the selected uplink beam based on the RSRP measurement of the received SRSs. In other examples, instead of the UE selecting the uplink beam, the scheduling entity 900 may select the uplink beam on which the UE may communicate therewith, and the communication and processing circuitry 944 may transmit spatial QCL information to the UE identifying the uplink beam selected for the UE.

The communication and processing circuitry 944 may further be configured to receive a report 915 from the UE including a set (e.g., respective set) of usable downlink beams for at least one uplink beam. The report 915 may be stored, for example, in memory 905. In some examples, the report 915 may further include a respective set of non-usable downlink beams for the at least one uplink beam. In some examples, the report 915 includes respective QCL information or a respective TCI state identifying each of the downlink beams. For example, the QCL information or TCI state may indicate a spatial property (e.g., beam direction, beam width, or associated downlink reference signal) of the downlink beam.

The communication and processing circuitry 944 may further be configured to transmit a threshold value to the UE for use in determining whether a particular downlink beam is usable or non-usable for a particular uplink beam. In some examples, the communication and processing circuitry 944 may further be configured to transmit a hysteresis value to the UE for use in determining both a first threshold utilized by the UE to identify usable downlink beams for each uplink beam and a second threshold utilized by the UE to identify non-usable downlink beams for each uplink beam. The threshold value and hysteresis value may be configured by the scheduling entity 900 or other network entity. The communication and processing circuitry 944 may further be configured to execute communication and processing software 954 stored on the computer-readable medium 906 to implement one or more of the functions described herein.

The processor 904 may further include beam selection circuitry 946, configured to select a downlink beam for communication of downlink transmissions to the UE based on a selected uplink beam for communication of uplink transmissions from the UE. In some examples, the beam selection circuitry 946 may be configured to receive one or more SRSs from the UE to identify the selected uplink beam based on the uplink beams on which the SRSs are received. In other examples, the beam selection circuitry 946 may select an uplink beam for the UE based on the received SRSs or a beam measurement report received from the UE. For example, when the channel is reciprocal, the beam selection circuitry 946 may identify the downlink beam with the highest quality in the beam measurement report and derive the selected uplink beam from the downlink beam with the highest quality.

The beam selection circuitry 946 may further be configured to select the downlink beam based on the report 915 including the respective sets of usable downlink beams per uplink beam received from the UE. For example, the beam selection circuitry 946 may be configured to select the downlink beam from the set of usable downlink beams for the selected uplink beam, as indicated in the report 915. In some examples, the selected usable downlink beam may have the highest quality of the usable downlink beams corresponding to the selected uplink beam. It should be understood that the beam selection circuitry 946 may utilize any suitable criteria in selecting the downlink beam from the set of usable downlink beams for the selected uplink beam. The beam selection circuitry 946 may further be configured to execute beam selection software 956 stored on the computer-readable medium 906 to implement one or more of the functions described herein.

Figure 10:
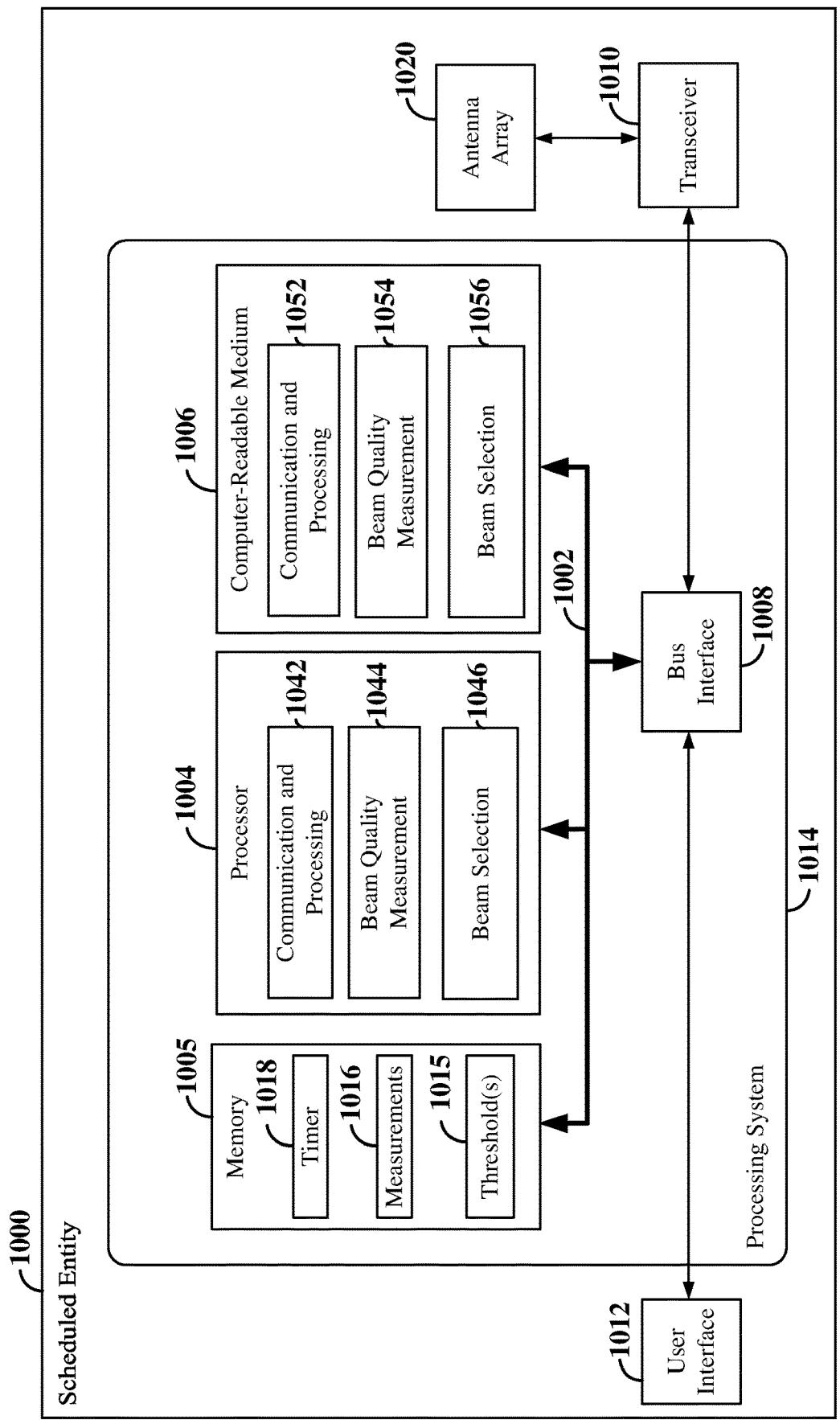
FIG. 10 is a block diagram illustrating an example of a hardware implementation for a scheduled entity employing a processing system.

FIG. 10 is a conceptual diagram illustrating an example of a hardware implementation for an exemplary scheduled entity 1000 employing a processing system 1014. For example, the scheduled entity 1000 may be a user equipment (UE) as illustrated in any of FIGS. 1, 2, 5, 6, and 8.

In accordance with various aspects of the disclosure, an element, or any portion of an element, or any combination of elements may be implemented with a processing system 1014 that includes one or more processors 1004. The processing system 1014 may be substantially the same as the processing system 914 illustrated in FIG. 9, including a bus interface 1008, a bus 1002, memory 1005, a processor 1004, and a computer-readable medium 1006. Furthermore, the scheduled entity 1000 may include a user interface 1012 and a transceiver 1010 substantially similar to those described above in FIG. 9. That is, the processor 1004, as utilized in a scheduled entity 1000, may be used to implement any one or more of the processes described below.

In some aspects of the disclosure, the processor 1004 may include communication and processing circuitry 1042, configured to communicate with a scheduling entity (e.g., base station or gNB). The communication and processing circuitry 1042 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1042 may be configured to generate and transmit uplink user data traffic and uplink control channels within one or more subframes, slots, and/or mini-slots in accordance with the resources assigned to the uplink user data traffic and/or uplink control information by the scheduling entity. In addition, the communication and processing circuitry 1042 may be configured to receive and process downlink user data traffic and downlink control channels within one or more subframes, slots, and/or mini-slots in accordance with the resources assigned to the downlink user data traffic and/or downlink control information by the scheduling entity. In some examples, the communication and processing circuitry 1042 may be configured to communicate with the scheduling entity when operating in a full duplex mode configured for concurrent transmission and reception within an overlapping bandwidth. In some examples, the communication and processing circuitry 1042 may be configured to transmit and/or receive beamformed signals via the transceiver 1010 and an antenna array 1020.

In some examples, the communication and processing circuitry 1042 may be configured to receive and process one or more downlink reference signals (e.g., CSI-RS and/or SSB) or other downlink signals on one or more downlink beams in accordance with the TCI states of the downlink signals. For example, the communication and processing circuitry 1042 may be configured to receive downlink signals on a set of configured downlink beams or a set of activated downlink beams of the configured downlink beams. For example, the set of configured or activated downlink beams may be indicated by a set of configured or activated spatial Rx parameters for communication of the PDSCH. In addition, the communication and processing circuitry 1042 may be configured to generate and transmit one or more uplink reference signals (e.g., SRS) on one or more uplink beams in accordance with the spatial QCL relationship(s) associated with the uplink reference signal (s).

The communication and processing circuitry 1042 may further be configured to transmit a report including a set (e.g., respective set) of usable downlink beams for at least one uplink beam. In some examples, the report may further include a respective set of non-usable downlink beams for the at least one uplink beam. In some examples, the report includes respective QCL information or a respective TCI state identifying each of the downlink beams. For example, the QCL information or TCI state may indicate a spatial property (e.g., beam direction, beam width, or associated downlink reference signal) of the downlink beam.

The communication and processing circuitry 1042 may further be configured to receive a network-configured threshold value for use in determining whether a particular downlink beam is usable or non-usable for a particular uplink beam. In some examples, the communication and processing circuitry 1042 may further be configured to receive a hysteresis value for use in determining both a first threshold utilized to identify usable downlink beams for each uplink beam and a second threshold utilized to identify non-usable downlink beams for each uplink beam. The communication and processing circuitry 1042 may further be configured to execute communication and processing software 1052 stored on the computer-readable medium 1006 to implement one or more of the functions described herein.

The processor 1004 may further include beam quality measurement circuitry 1044, configured to measure, for each of one or more uplink beams, the beam quality of one or more downlink beams received from the scheduling entity to produce a plurality of beam quality measurements 1016. In some examples, the beam quality measurement circuitry 1044 may be configured to select the downlink beams on which to measure the beam quality from the set of configured downlink beams configured by the scheduling entity for communication with the scheduled entity 1000. For example, the beam quality measurement circuitry 1044 may be configured to measure the beam quality on each configured downlink beam or on a subset of the set of configured downlink beams. In other examples, the beam quality measurement circuitry 1044 may be configured to select the downlink beams on which to measure the beam quality from the set of activated downlink beams within the set of configured downlink beams activated by the scheduling entity for communication with the scheduled entity 1000. For example, the beam quality measurement circuitry 1044 may be configured to measure the beam quality on each activated downlink beam or on a subset of the set of activated downlink beams.

In some examples, the beam quality measurements 1016 may include the RSRP, RSRQ, RSSI, and/or SINR on each of the one or more downlink beams per uplink beam. Each of the beam quality measurements 1016 (e.g., RSRP, RSRQ, RSSI, and SINR) may be degraded by self-interference resulting from concurrent communication on both an uplink beam and a downlink beam within an overlapping bandwidth when operating in full duplex mode. Therefore, each downlink beam quality measurement 1016 takes into account the self-interference experienced on a particular downlink beam resulting from an uplink transmission on an uplink beam.

In some examples, the SINR includes a self-interference contribution that may also be measured. For example, when the scheduled entity is configured for uplink beam management (e.g., the scheduled entity may select the uplink beam for communication with the scheduling entity), the beam quality measurement circuitry 1044 may be configured to measure the self-interference contribution on each downlink beam for different SRSs (e.g., different uplink beams) In some examples, the self-interference contribution on a downlink beam resulting from transmission of an SRS on an uplink beam may be measured over the same resource elements (REs) as the downlink beam quality of the downlink beam. In other examples, the self-interference contribution on a downlink beam resulting from transmission of an SRS on an uplink beam may be measured over different REs than the downlink beam quality of the downlink beam. The beam quality measurement circuitry 1044 may further be configured to execute beam quality measurement software 1054 stored on the computer-readable medium 1006 to implement one or more of the functions described herein.

The processor 1004 may further include beam selection circuitry 1046, configured to identify, for each of one or more uplink beams, a corresponding set of usable downlink beams on which downlink transmissions may be received from the scheduling entity based on the beam quality measurements 1016. In some examples, the beam selection circuitry 1046 may further be configured to identify, for each of the one or more uplink beams, a corresponding set of non-usable downlink beams based on the beam quality measurements 1016. Here, the set of usable downlink beams and the set of non-usable downlink beams are non-overlapping (e.g., each downlink beam is included within only one of the sets of usable and non-usable downlink beams).

In some examples, the beam selection circuitry 1046 may be configured to identify the set of usable downlink beams and the set of non-usable downlink beams based on one or more thresholds 1015 maintained, for example, in memory 1005. In some examples, the scheduled entity 1000 may maintain different thresholds for different types of beam quality measurements (e.g., RSRP, RSRQ, RSSI, and SINR). In some examples, the beam selection circuitry 1046 may receive a network-configured threshold amount (or separate threshold amounts for each beam quality measurement type), and optionally a network-configured hysteresis value (or separate hysteresis values for each beam quality measurement type), from the communication and processing circuitry 1042 and determine one or more of the threshold(s) 1015 based on the threshold amount and hysteresis value. For example, the beam selection circuitry 1046 may be configured to set a beam quality threshold 1015 equal to the network-configured threshold amount. In this example, the beam selection circuitry may identify the set of usable downlink beams as the downlink beams for which the respective beam quality measurements 1016 exceed the beam quality threshold 1015. In addition, the beam selection circuitry may identify the set of non-usable downlink beams as the downlink beams for which the respective beam quality measurements 1016 are less than the beam quality threshold 1015.

As another example, the beam selection circuitry 1046 may be configured to set a first threshold 1015 equal to the sum of the network-configured threshold amount and the hysteresis value and a second threshold 1015 equal to the difference between the network-configured threshold amount and the hysteresis value. In this example, the beam selection circuitry 1046 may be configured to identify the set of usable downlink beams as the downlink beams for which the respective beam quality measurements 1016 exceed the first threshold 1015. In addition, the beam selection circuitry 1046 may be configured to identify the set of non-usable downlink beams as the downlink beams for which the respective beam quality measurements 1016 are less than the second threshold 1015.

In either of the above examples (e.g., using or not using the hysteresis value), the beam selection circuitry 1046 may further be configured to identify, for each uplink beam, the set of usable downlink beams as the downlink beams for which the associated beam quality measurements exceed the beam quality threshold (or first threshold) 1015 over a duration of time. For example, the beam selection circuitry 1046 may initialize a timer 1018 maintained, for example, in memory 1005 upon performing an initial beam quality measurement 1016 on a downlink beam for an uplink beam. At expiration of the timer 1018, the beam selection circuitry 1046 may then compare each of the obtained beam quality measurements 1016 on the downlink beam per the uplink beam to the beam quality threshold 1015 (or first threshold) 1015. In some examples, if each of the beam quality measurements 1016 on the downlink beam obtained over the period of the timer 1018 exceeds the beam quality threshold (or first threshold) 1015, the beam selection circuitry 1046 may determine that the downlink beam is a usable downlink beam for the uplink beam. Otherwise, the beam selection circuitry 1046 may determine that the downlink beam is a non-usable downlink beam for the uplink beam. In some examples, the beam selection circuitry 1046 may further utilize a measurement number threshold 1015 to determine whether the downlink beam is usable or non-usable. For example, the beam selection circuitry 1046 may determine that the downlink beam is a usable downlink beam for the uplink beam if the number of beam quality measurements 1016 that exceed the beam quality threshold (or first quality threshold) 1015 at expiration of the timer 1018 exceeds the measurement number threshold 1015.

The beam selection circuitry 1046 may further be configured to generate and transmit (e.g., via the communication and processing circuitry 1042 and transceiver 1010) a report including the respective sets of usable downlink beams for each of one or more uplink beams. In some examples, the report may further include the respective sets of non-usable downlink beams for each of the one or more uplink beams. In some examples, the report may be a beam measurement report that further includes the obtained beam quality measurements for each of the downlink beams per uplink beam. In other examples, the report may be a separate report generated and transmitted separately from the beam measurement report. In some examples, the report includes respective QCL information or a respective TCI state identifying each of the downlink beams in each of the sets. For example, the QCL information or TCI state may indicate a spatial property (e.g., beam direction, beam width, or associated downlink reference signal) of the downlink beam.

The beam selection circuitry 1046 may further be configured to select an uplink beam (or uplink beams) for communication with the scheduling entity. In some examples, the beam selection circuitry 1046 may be configured to receive spatial QCL information indicating the selected uplink beam(s) from the scheduling entity. In other examples, the scheduled entity 1000 may be configured for uplink beam management or uplink non-codebook based MIMO. In this example, the beam selection circuitry 1046 may be configured to select the uplink beam(s). In some examples, the beam selection circuitry 1046 may be configured to select the uplink beam(s) based on the beam quality measurements 1016 per uplink beam. For example, the beam selection circuitry 1046 may select the uplink beam for which the corresponding downlink beam quality measurements 1016 have the highest values. The beam selection circuitry 1046 may further be configured to indicate the selected uplink beam (or uplink beams) to the scheduling entity. For example, the beam selection circuitry 1046 may indicate the selected uplink beam(s) by transmitting SRSs on the selected uplink beam(s) to the scheduling entity. The beam selection circuitry 1046 may further be configured to execute beam selection software 1056 stored on the computer-readable medium 1006 to implement one or more of the functions described herein.

Figure 11:
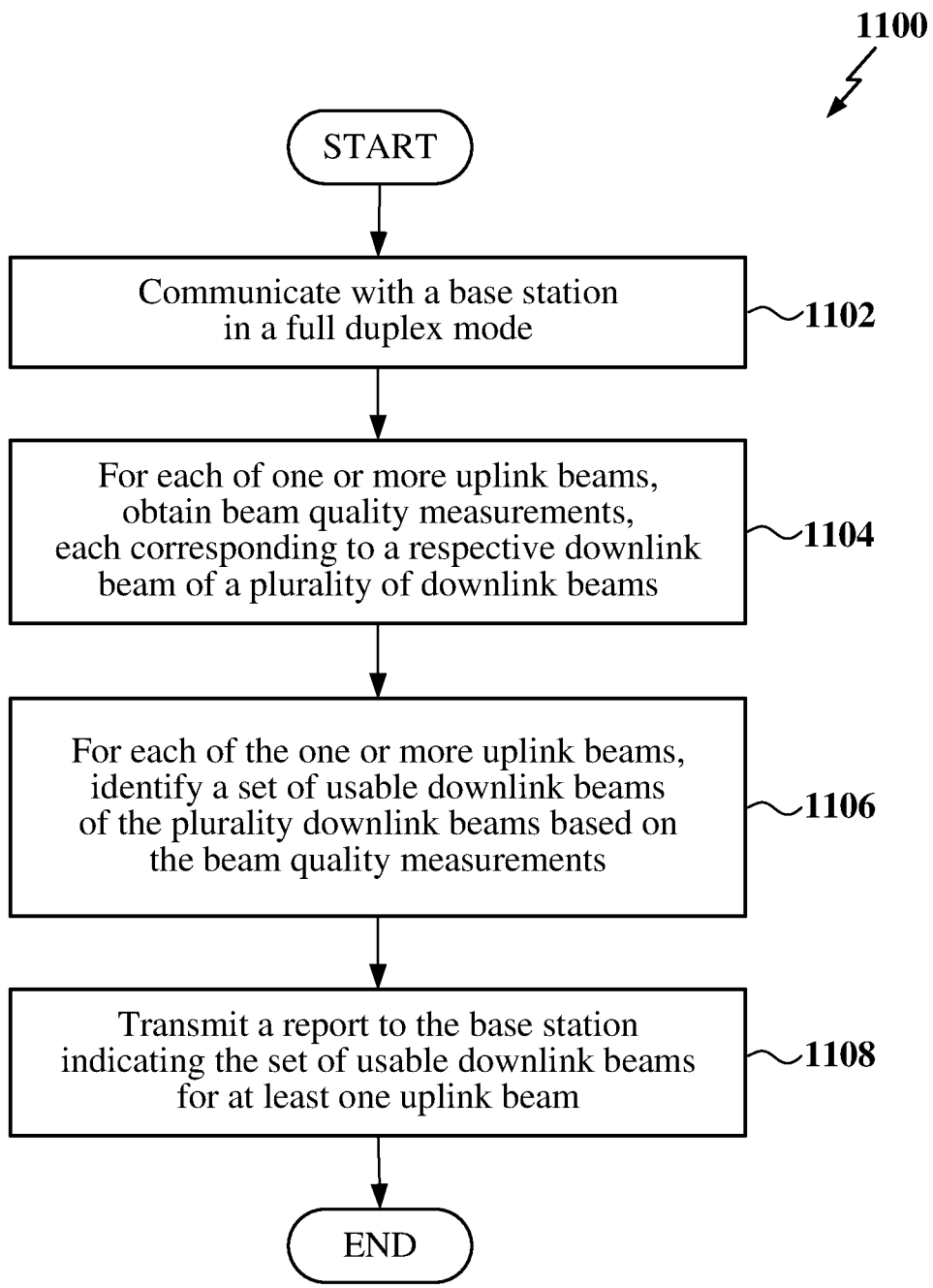
FIG. 11 is a flow chart illustrating an exemplary process for a user equipment to identify usable downlink beams per uplink beam when operating in full duplex mode.

FIG. 11 is a flow chart illustrating an exemplary process 1100 for a UE to identify usable downlink beams per uplink beam when operating in full duplex mode in accordance with some aspects of the present disclosure. As described below, some or all illustrated features may be omitted in a particular implementation within the scope of the present disclosure, and some illustrated features may not be required for implementation of all embodiments. In some examples, the process 1100 may be carried out by the scheduled entity 1000 illustrated in FIG. 10. In some examples, the process 1100 may be carried out by any suitable apparatus or means for carrying out the functions or algorithm described below.

At block 1102, the scheduled entity (e.g., a UE) may communicate with a scheduling entity (e.g., a base station) in a full duplex mode configured for concurrent transmission and reception within an overlapping bandwidth. For example, the communication and processing circuitry 1042 and transceiver 1010 shown and described above in reference to FIG. 10 may communicate with the base station in full duplex mode.

At block 1104, the UE may, for each of one or more uplink beams, obtain beam quality measurements, each corresponding to a downlink beam of a plurality of downlink beams. In some examples, the UE may select the downlink beams on which to measure the beam quality from a set of configured downlink beams configured by the base station for communication with the UE. In other examples, the UE may select the downlink beams on which to measure the beam quality from a set of activated downlink beams within the set of configured downlink beams activated by the base station for communication with the UE. In some examples, the beam quality measurements may include the RSRP, RSRQ, RSSI, and/or SINR on each of the one or more downlink beams per uplink beam. For example, the beam quality measurement circuitry 1044 shown and described above in reference to FIG. 10 may obtain the downlink beam quality measurements per uplink beam.

At block 1106, the UE may, for each of the one or more uplink beams, identify a set of usable downlink beams of the plurality of downlink beams based on the beam quality measurements. For example, the beam selection circuitry 1046 shown and described above in reference to FIG. 10 may identify a set (e.g., respective set) of usable downlink beams for each uplink beam. In some examples, the UE may further identify, for each of the one or more uplink beams, a corresponding set of non-usable downlink beams based on the beam quality measurements. In some examples, the UE may identify the set of usable downlink beams and the set of non-usable downlink beams based on one or more thresholds.

For example, for each of the one or more uplink beams, the UE may compare the beam quality measurements associated with each of the plurality of downlink beams to a threshold and identify the set of usable downlink beams for which the respective beam quality measurements exceed the threshold. The UE may further identify the set of usable downlink beams as the downlink beams for which the associated beam quality measurements exceed the threshold over a duration of time. Similarly, for each of the one or more uplink beams, the UE may identify the set of non-usable downlink beams for which the beam quality measurements are less than the threshold. In some examples, the UE may receive a network-configured threshold amount and a network-configured hysteresis value from the base station and determine a first threshold for use in determining the set of usable downlink beams and a second threshold for use in determining the set of non-usable downlink beams based on the threshold amount and hysteresis value.

At block 1108, the UE may transmit a report to the base station indicating the set of usable downlink beams for at least one uplink beam. In some examples, the report may further include the respective sets of non-usable downlink beams for each of the one or more uplink beams. In some examples, the report includes respective QCL information or a respective TCI state identifying each of the downlink beams in each of the sets. For example, the QCL information or TCI state may indicate a spatial property (e.g., beam direction, beam width, or associated downlink reference signal) of the downlink beam. For example, the beam selection circuitry 1046, together with the communication and processing circuitry 1042 and transceiver 1010, may generate and transmit the report to the base station.

Figure 12:
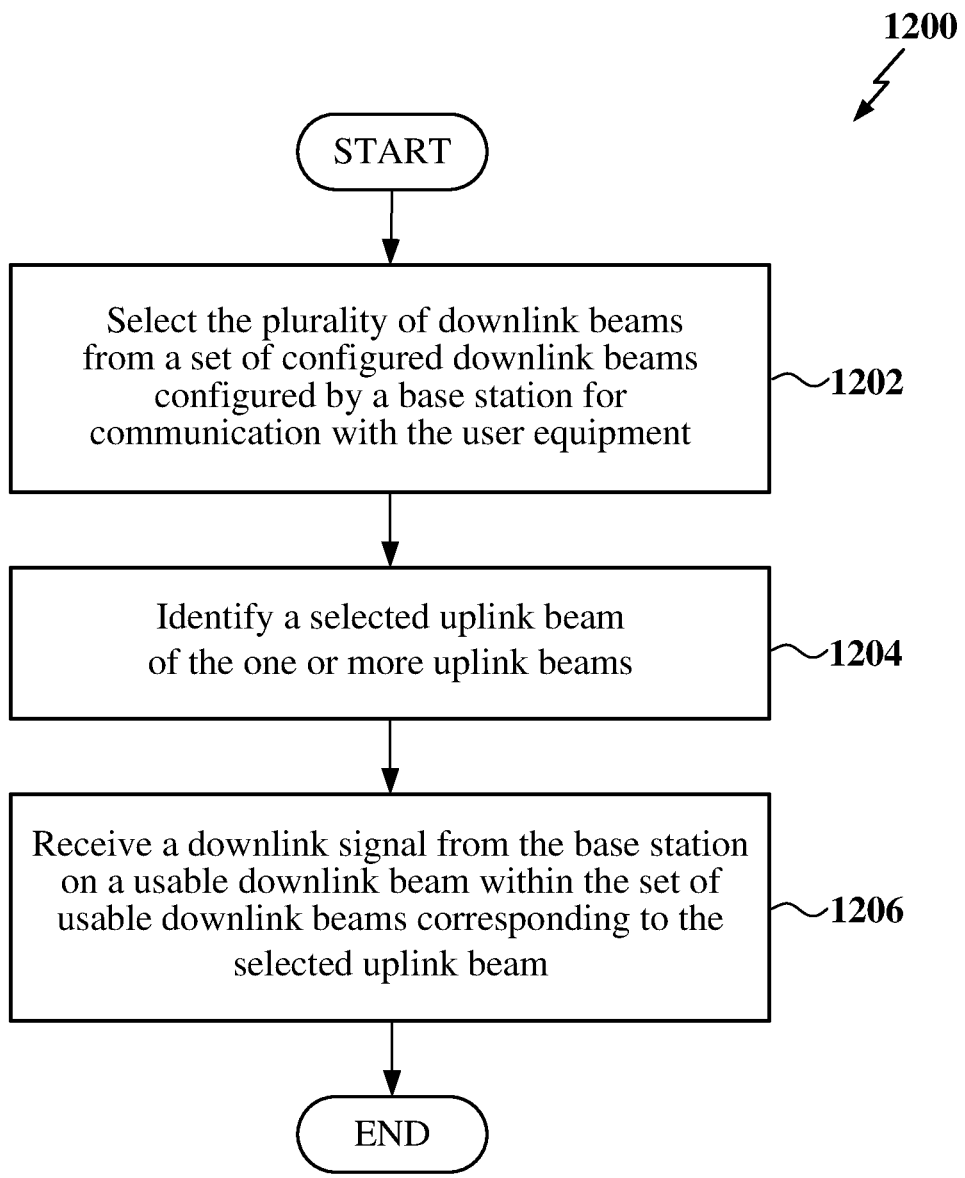
FIG. 12 is a flow chart illustrating an exemplary process for a user equipment to identify and use beams when operating in full duplex mode.

FIG. 12 is a flow chart illustrating an exemplary process 1200 for a UE to identify and use beams when operating in full duplex mode in accordance with some aspects of the present disclosure. In some examples, the process 1200 may be performed in conjunction with (e.g., as part of and/or in addition to) the process 1100 of FIG. 11. As described below, some or all illustrated features may be omitted in a particular implementation within the scope of the present disclosure, and some illustrated features may not be required for implementation of all embodiments. In some examples, the process 1200 may be carried out by the scheduled entity 1000 illustrated in FIG. 10. In some examples, the process 1200 may be carried out by any suitable apparatus or means for carrying out the functions or algorithm described below.

At block 1202, the scheduled entity (e.g., a UE) may select the plurality of downlink beams (from block 1104 of FIG. 11) from a set of configured downlink beams configured by a base station for communication with the user equipment. For example, the beam quality measurement circuitry 1044, the communication and processing circuitry 1042, and the transceiver 1010 shown and described above in reference to FIG. 10 may receive beam configuration information from a gNB (e.g., via RRC signaling) that identifies configured downlink beams and then receive activation/deactivation information (e.g., via a MAC-CE) that indicates which of these downlink beams is currently activated. The beam quality measurement circuitry 1044 may then elect to the use the activated downlink beams for the identification of the usable downlink beams (at block 1106 of FIG. 11) in some examples.

At block 1204, the UE may identify a selected uplink beam of the one or more uplink beams (from block 1104 of FIG. 11). In some examples, the beam selection circuitry 1046, the communication and processing circuitry 1042 and the transceiver 1010, shown and described above in reference to FIG. 10 may receive an indication of the selected uplink beam from the base station. For example, the base station may send spatial QCL information to the UE identifying an uplink beam selected for the UE. In some examples, the beam selection circuitry 1046 may identify the selected uplink beam based on an RSRP measurement and then, in cooperation with the communication and processing circuitry 1042 and the transceiver 1010, transmit an indication of the selected uplink beam to the base station.

At block 1206, the UE may receive a downlink signal from the base station on a usable downlink beam within the set of usable downlink beams corresponding to the selected uplink beam (from block 1204). For example, the communication and processing circuitry 1042 and the transceiver 1010, shown and described above in reference to FIG. 10 may monitor a downlink channel (e.g., PDSCH) to receive data from a gNB during a full duplex mode of operation.

Figure 13:
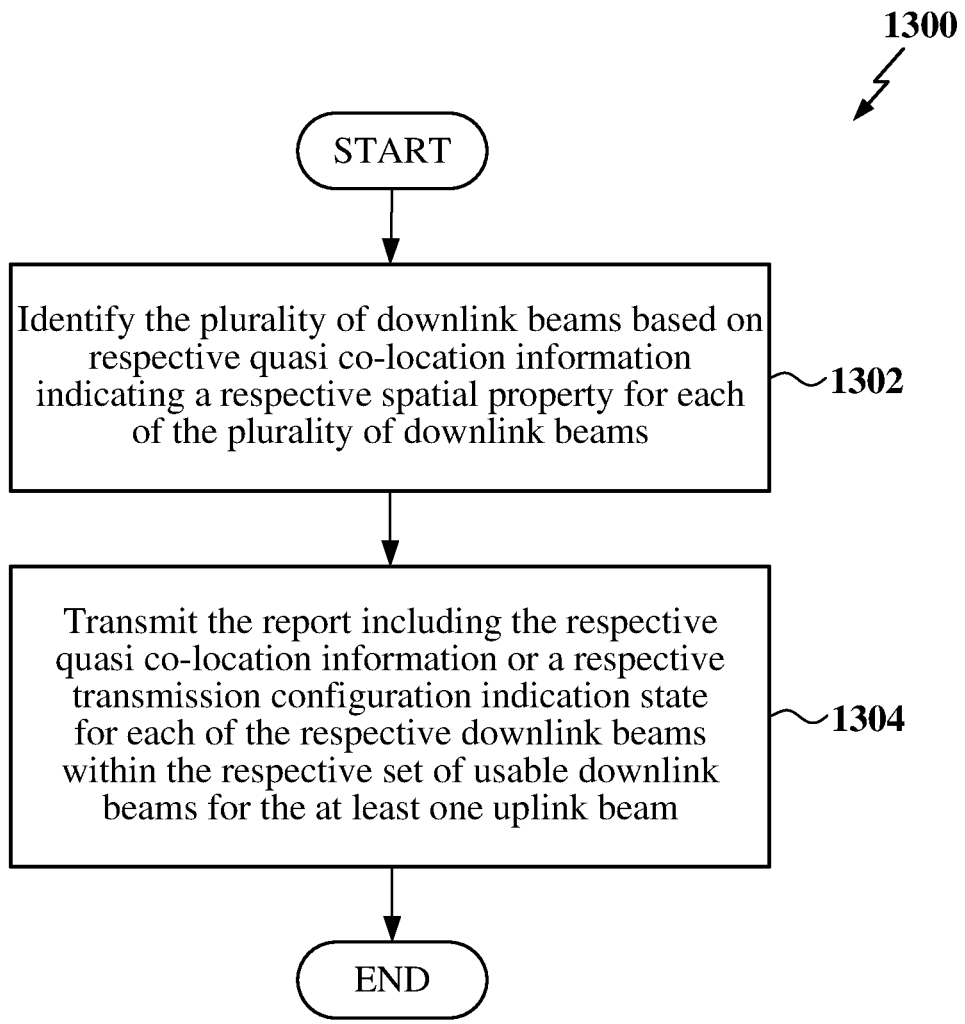
FIG. 13 is a flow chart illustrating an exemplary process for a user equipment to identify quasi co-location information for a downlink beam when operating in full duplex mode.

FIG. 13 is a flow chart illustrating an exemplary process 1300 for a UE to identify quasi co-location information for a downlink beam when operating in full duplex mode in accordance with some aspects of the present disclosure. In some examples, the process 1300 may be performed in conjunction with (e.g., as part or and/or in addition to) the process 1100 of FIG. 11. As described below, some or all illustrated features may be omitted in a particular implementation within the scope of the present disclosure, and some illustrated features may not be required for implementation of all embodiments. In some examples, the process 1300 may be carried out by the scheduled entity 1000 illustrated in FIG. 10. In some examples, the process 1300 may be carried out by any suitable apparatus or means for carrying out the functions or algorithm described below.

At block 1302, the scheduled entity (e.g., a UE) may identify the plurality of downlink beams (from block 1104 of FIG. 11) based on respective quasi co-location information indicating a respective spatial property for each of the plurality of downlink beams. For example, the beam selection circuitry 1046, the communication and processing circuitry 1042 and the transceiver 1010, shown and described above in reference to FIG. 10 may determine the quasi co-location information and/or a respective transmission configuration indication (TCI) state for each of the plurality of downlink beams from beam configuration information received from the base station.

At block 1304, the UE may transmit the report (from block 1108 of FIG. 11) including the respective quasi co-location information or a respective transmission configuration indication state for each of the respective downlink beams within the set (e.g., respective set) of usable downlink beams for the at least one uplink beam. For example, the beam selection circuitry 1046, together with the communication and processing circuitry 1042 and transceiver 1010, may include the quasi co-location information or the respective transmission configuration indication state for the usable downlink beams in the report and transmit the report to the base station.

Figure 14:
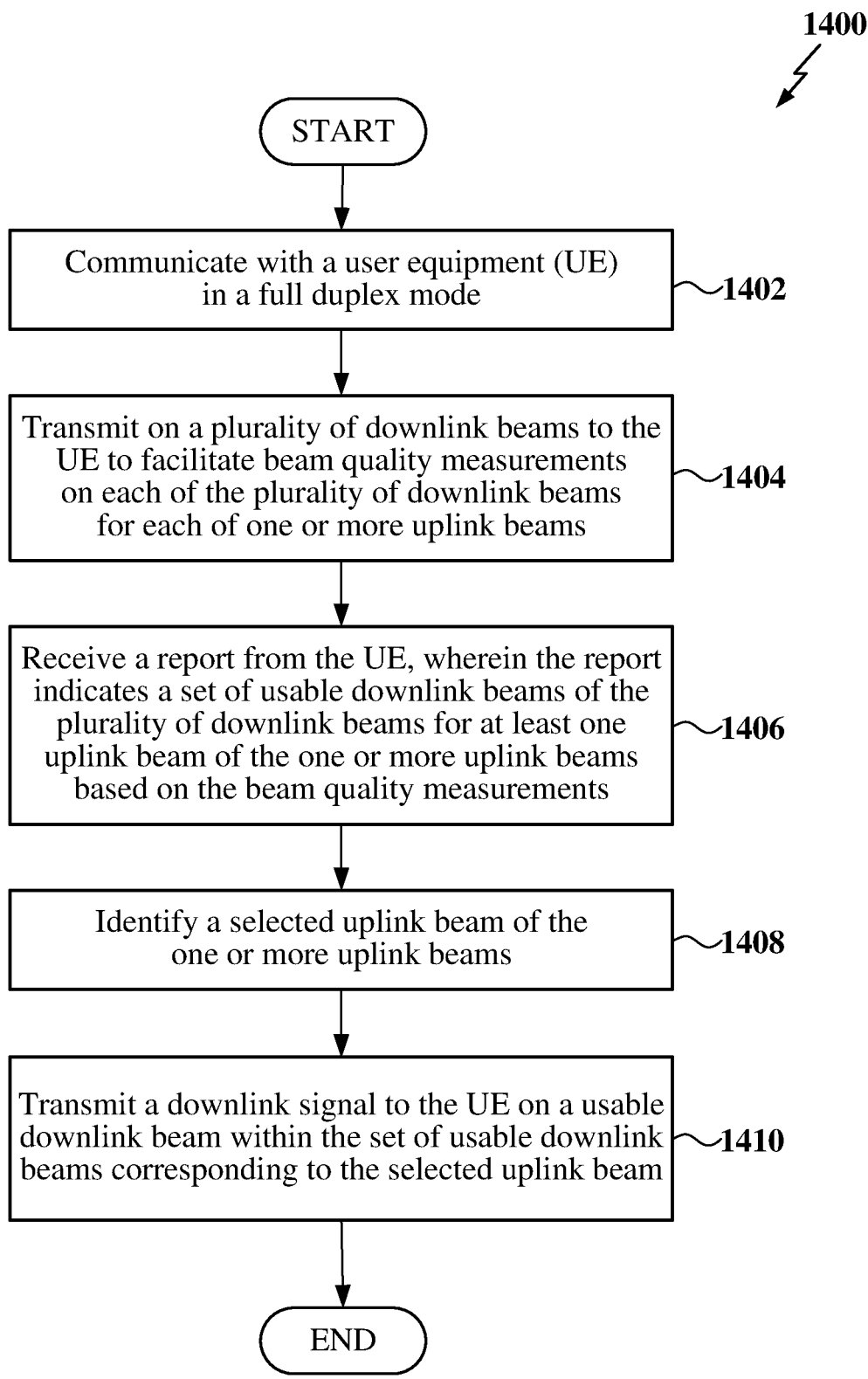
FIG. 14 is a flow chart illustrating an exemplary process for a base station to select a downlink beam based on a selected uplink beam when a UE is operating in full duplex mode.

FIG. 14 is a flow chart illustrating an exemplary process 1400 for a base station to select a downlink beam based on a selected uplink beam when a UE is operating in full duplex mode in accordance with some aspects of the present disclosure. As described below, some or all illustrated features may be omitted in a particular implementation within the scope of the present disclosure, and some illustrated features may not be required for implementation of all embodiments. In some examples, the process 1400 may be carried out by the scheduling entity 900 illustrated in FIG. 9. In some examples, the process 1400 may be carried out by any suitable apparatus or means for carrying out the functions or algorithm described below.

At block 1402, the scheduling entity (e.g., a base station) may communicate with the scheduled entity (e.g., a UE) operating in a full duplex mode configured for concurrent transmission and reception within an overlapping bandwidth. For example, the communication and processing circuitry 944 and transceiver 910 shown and described above in reference to FIG. 9 may communicate with UE operating in full duplex mode.

At block 1404, the base station may transmit on a plurality of downlink beams to the UE to facilitate beam quality measurements on each of the plurality of downlink beams for each of one or more uplink beams. In some examples, the base station may transmit downlink reference signals on the plurality of downlink beams to facilitate beam quality measurements. The plurality of downlink beams may include, for example, a set of configured downlink beams or activated downlink beams for the UE. For example, the communication and processing circuitry 944 and transceiver 910 shown and described above in reference to FIG. 9 may transmit to the UE on a plurality of downlink beams.

At block 1406, the base station may receive a report from the UE, wherein the report indicates a set (e.g., respective set) of usable downlink beams of the plurality of downlink beams for at least one uplink beam of the one or more uplink beams based on the beam quality measurements. In some examples, the report may further include a respective set of non-usable downlink beams for the at least one uplink beam. In some examples, the report includes respective QCL information or a respective TCI state identifying each of the downlink beams. For example, the QCL information or TCI state may indicate a spatial property (e.g., beam direction, beam width, or associated downlink reference signal) of the downlink beam. For example, the communication and processing circuitry 944 and transceiver 910 shown and described above in reference to FIG. 9 may receive the report from the UE.

At block 1408, the base station may identify a selected uplink beam of the one or more uplink beams that UE may utilize to communicate with the base station. In some examples, the base station may be configured to receive one or more SRSs from the UE and to identify the selected uplink beam based on the uplink beams on which the SRSs are received. In other examples, the base station may select an uplink beam for the UE based on the received SRSs or a beam measurement report received from the UE. For example, the beam selection circuitry 946 shown and described above in reference to FIG. 9 may identify a selected uplink beam.

At block 1410, the base station may transmit a downlink signal to the UE on a usable downlink beam within the set of usable downlink beams corresponding to the selected uplink beam. For example, the base station may select a usable downlink beam from the set of usable downlink beams corresponding to the selected uplink beam for transmission of the downlink signal. In some examples, the selected usable downlink beam may have the highest quality of the usable downlink beams corresponding to the selected uplink beam. For example, the beam selection circuitry 946, communication and processing circuitry 944, and transceiver 910 shown and described above in reference to FIG. 9 may transmit the downlink signal to the UE on the selected usable downlink beam.

Figure 15:
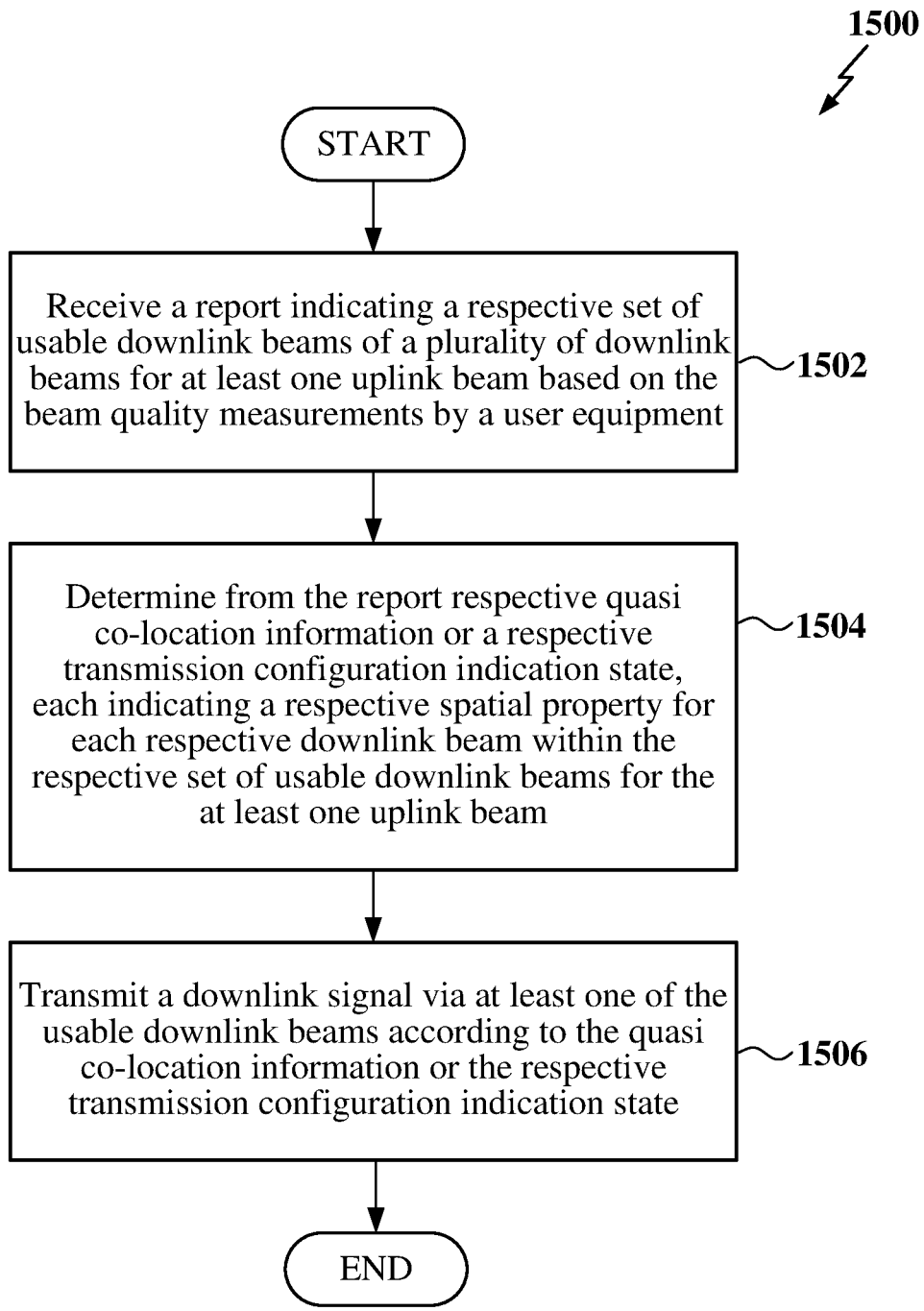
FIG. 15 is a flow chart illustrating an exemplary process for a base station to identify quasi co-location information for a downlink beam when operating in full duplex mode.

FIG. 15 is a flow chart illustrating an exemplary process 1500 for a base station to select a downlink beam based on a selected uplink beam when a UE is operating in full duplex mode in accordance with some aspects of the present disclosure. As described below, some or all illustrated features may be omitted in a particular implementation within the scope of the present disclosure, and some illustrated features may not be required for implementation of all embodiments. In some examples, the process 1500 may be carried out by the scheduling entity 900 illustrated in FIG. 9. In some examples, the process 1500 may be carried out by any suitable apparatus or means for carrying out the functions or algorithm described below.

At block 1502, the scheduling entity (e.g., a base station) may receive a report indicating a set (e.g., respective set) of usable downlink beams of a plurality of downlink beams for at least one uplink beam based on the beam quality measurements by a user equipment (e.g., from block 1406 of FIG. 14). For example, the communication and processing circuitry 944 and transceiver 910 shown and described above in reference to FIG. 9 may monitor a data channel (e.g., a PUSCH) for report messages from the UE.

At block 1504, the base station may determine from the report respective quasi co-location information or a respective transmission configuration indication state, each indicating a respective spatial property for each respective downlink beam within the set (e.g., respective set) of usable downlink beams for the at least one uplink beam. For example, the beam selection circuitry 946 shown and described above in reference to FIG. 9 may parse a report message received from the UE to identify a beam direction and/or a beam width for each respective downlink beam.

At block 1506, the base station may transmit a downlink signal via at least one of the usable downlink beams according to the quasi co-location information or the respective transmission configuration indication state. For example, the beam selection circuitry 946, communication and processing circuitry 944, and transceiver 910 shown and described above in reference to FIG. 9 may transmit the downlink signal to the UE using the identified beam direction and/or beam width.

In one configuration, a scheduled entity (e.g., a UE) includes means for communicating with a scheduling entity in a full duplex mode configured for concurrent transmission and reception within an overlapping bandwidth, means for obtaining, for each of one or more uplink beams, beam quality measurements, each corresponding to a respective downlink beam of a plurality of downlink beams, means for identifying, for each of the one or more uplink beams, a set of usable downlink beams of the plurality of downlink beams based on the beam quality measurements, and means for transmitting a report to the scheduling entity indicating the set (e.g., respective set) of usable downlink beams for at least one uplink beam of the one or more uplink beams.

In one aspect, the aforementioned means for communicating, means for obtaining, means for identifying, and means for transmitting may be the processor(s) 1004 shown in FIG. 10 configured to perform the functions recited by the aforementioned means. For example, the means for communicating with the scheduling entity may include the communication and processing circuitry 1042 and transceiver 1010 shown in FIG. 10. As another example, the means for obtaining beam quality measurements for each of one or more uplink beams may include the beam quality measurement circuitry 1044 shown in FIG. 10. As yet another example, the means for identifying a set of usable downlink beams for each of the one or more uplink beams may include the beam selection circuitry 1046 shown in FIG. 10. As still another example, the means for transmitting the report may include the beam selection circuitry 1046, communication and processing circuitry 1042 and transceiver 1010 shown in FIG. 10. In another aspect, the aforementioned means may be a circuit or any apparatus configured to perform the functions recited by the aforementioned means.

In another configuration, a scheduling entity (e.g., a base station) includes means for communicating with a scheduled entity in a full duplex mode configured for concurrent transmission and reception within an overlapping bandwidth, means for transmitting on a plurality of downlink beams to the scheduled entity to facilitate beam quality measurements on each of the plurality of downlink beams for each of one or more uplink beams, means for receiving a report from the scheduled entity including a set (e.g., respective set) of usable downlink beams of the plurality of downlink beams for at least one uplink beam of the one or more uplink beams based on the beam quality measurements, means for identifying a selected uplink beam of the one or more uplink beams, and means for transmitting a downlink signal to the scheduled entity on a usable downlink beam within the set of usable downlink beams corresponding to the selected uplink beam.

In one aspect, the aforementioned means for communicating with the scheduled entity, means for transmitting on a plurality of downlink beams, means for receiving the report, means for identifying the selected uplink beam, and means for transmitting the downlink signal on the usable downlink beam may include the processor(s) 904 shown in FIG. 9 configured to perform the functions recited by the aforementioned means. For example, the means for communicating with the scheduled entity, the means for transmitting on the plurality of downlink beams, and the means for receiving the report may include the communication and processing circuitry 944 and transceiver 910 shown in FIG. 9. As another example, the means for identifying the selected uplink beam may include the beam selection circuitry 946 shown in FIG. 9. As yet another example, the means for transmitting the downlink signal on the usable downlink beam may include the beam selection circuitry 946, communication and processing circuitry 944 and transceiver 910 shown in FIG. 9. In another aspect, the aforementioned means may be a circuit or any apparatus configured to perform the functions recited by the aforementioned means.

The following provides an overview of several aspects of the present disclosure.

Aspect 1: A method for wireless communication at a user equipment, the method comprising: communicating with a base station in a full duplex mode configured for concurrent transmission and reception within an overlapping bandwidth; for each of one or more uplink beams, obtaining beam quality measurements, each corresponding to a respective downlink beam of a plurality of downlink beams; for each of the one or more uplink beams, identifying a set of usable downlink beams of the plurality of downlink beams based on the beam quality measurements; and transmitting a report to the base station indicating the set of usable downlink beams for at least one uplink beam of the one or more uplink beams.

Aspect 2: The method of aspect 1, further comprising: identifying a selected uplink beam of the one or more uplink beams; and receiving a downlink signal from the base station on a usable downlink beam within the set of usable downlink beams corresponding to the selected uplink beam.

Aspect 3: The method of aspect 1 or 2, further comprising: selecting the plurality of downlink beams from a set of configured downlink beams configured by the base station for communication with the user equipment.

Aspect 4: The method of aspect 3, wherein selecting the plurality of downlink beams further comprises: selecting the plurality of downlink beams from a set of activated downlink beams within the set of configured downlink beams activated by the base station for communication with the user equipment.

Aspect 5: The method of aspect 4, wherein selecting the plurality of downlink beams further comprises: selecting a subset of the set of configured downlink beams as the plurality of downlink beams.

Aspect 6: The method of aspect 4, wherein selecting the plurality of downlink beams further comprises: selecting a subset of the set of activated downlink beams as the plurality of downlink beams.

Aspect 7: The method of any of aspects 1 through 6, further comprising: identifying the plurality of downlink beams based on respective quasi co-location information indicating a respective spatial property for each of the plurality of downlink beams.

Aspect 8: The method of aspect 7, wherein the spatial property comprises at least one of a beam direction, a beam width, or an associated downlink reference signal.

Aspect 9: The method of aspect 7, wherein transmitting the report further comprises: transmitting the report comprising the respective quasi co-location information or a respective transmission configuration indication state for each of the respective downlink beams within the set of usable downlink beams for the at least one uplink beam.

Aspect 10: The method of any of aspects 1 through 9, further comprising: for each of the one or more uplink beams, identifying a set of non-usable downlink beams of the plurality of downlink beams based on the beam quality measurements, wherein the set of usable downlink beams and the set of non-usable downlink beams are non-overlapping.

Aspect 11: The method of aspect 10, wherein transmitting the report further comprises: transmitting the report indicating the set of usable downlink beams and the set of non-usable downlink beams of the plurality of downlink beams for each of the one or more uplink beams.

Aspect 12: The method of any of aspects 1 through 11, wherein for each of the one or more uplink beams, identifying the set of usable downlink beams further comprises: comparing the beam quality measurements associated with each of the plurality of downlink beams to a threshold; and identifying the set of usable downlink beams for which respective beam quality measurements exceed the threshold.

Aspect 13: The method of aspect 12, wherein for each of the one or more uplink beams, identifying the set of usable downlink beams further comprises: identifying the set of usable downlink beams for which the respective beam quality measurements exceed the threshold over a duration of time.

Aspect 14: The method of aspect 12, wherein the threshold comprises a first threshold and further comprising: comparing the beam quality measurements associated with each of the plurality of downlink beams to a second threshold; for each of the one or more uplink beams, identifying a set of non-usable downlink beams of the plurality of downlink beams for which respective beam quality measurements are less than the second threshold.

Aspect 15: The method of aspect 14, further comprising: receiving a threshold amount and a hysteresis value from the base station; and determining the first threshold and the second threshold based on the threshold amount and the hysteresis value.

Aspect 16: The method of any of aspects 1 through 15, wherein the beam quality measurements comprise at least one of reference signal received power (RSRP), reference signal received quality (RSRQ), received signal strength indicator (RSSI), and signal-to-interference-plus-noise ratio (SINR).

Aspect 17: The method of aspect 16, wherein the SINR comprises a self-interference contribution.

Aspect 18: A user equipment (UE) comprising: a transceiver configured to communicate with a radio access network, a memory, and a processor communicatively coupled to the transceiver and the memory, wherein the processor and the memory are configured to perform any one of aspects 1 through 17.

Aspect 19: An apparatus configured for wireless communication comprising at least one means for performing any one of aspects 1 through 17.

Aspect 20: A non-transitory computer-readable medium storing computer-executable code, comprising code for causing an apparatus to perform any one of aspects 1 through 17.

Aspect 21: A method for wireless communication at a base station, the method comprising: communicating with a user equipment (UE) in a full duplex mode configured for concurrent transmission and reception within an overlapping bandwidth; transmitting on a plurality of downlink beams to the UE to facilitate beam quality measurements on each of the plurality of downlink beams for each of one or more uplink beams; receiving a report from the UE, wherein the report comprises a set of usable downlink beams of the plurality of downlink beams for at least one uplink beam of the one or more uplink beams based on the beam quality measurements; identifying a selected uplink beam of the one or more uplink beams; and transmitting a downlink signal to the UE on a usable downlink beam within the set of usable downlink beams corresponding to the selected uplink beam.

Aspect 22: The method of aspect 21, wherein transmitting on the plurality of downlink beams further comprises: transmitting downlink reference signals on each of the plurality of downlink beams.

Aspect 23: The method of aspect 21 or 22, wherein the plurality of downlink beams comprise a set of configured downlink beams configured by the base station for communication with the UE.

Aspect 24: The method of aspect 23, wherein the plurality of downlink beams comprise a set of activated downlink beams within the set of configured downlink beams activated by the base station for communication with the UE.

Aspect 25: The method of any of aspects 21 through 24, wherein receiving the report further comprises: receiving the report comprising respective quasi co-location information or a respective transmission configuration indication state, each indicating a respective spatial property for each respective downlink beam within the set of usable downlink beams for the at least one uplink beam.

Aspect 26: The method of aspect 25, wherein the spatial property comprises at least one of a beam direction, a beam width, or an associated downlink reference signal.

Aspect 27: The method of any of aspects 21 through 26, wherein receiving the report further comprises: receiving the report indicating the set of usable downlink beams and a respective set of non-usable downlink beams of the plurality of downlink beams for the at least one uplink beam, wherein the set of usable downlink beams and the set of non-usable downlink beams are non-overlapping.

Aspect 28: The method of any of aspects 21 through 27, further comprising: transmitting a threshold amount and a hysteresis value to the UE for use by the UE in determining at least one threshold associated with the beam quality measurements obtained on each of the plurality of downlink beams for each of the one or more uplink beams.

Aspect 29: A base station (BS) comprising: a transceiver, a memory, and a processor communicatively coupled to the transceiver and the memory, wherein the processor is configured to perform any one of aspects 21 through 28.

Aspect 30: An apparatus configured for wireless communication comprising at least one means for performing any one of aspects 21 through 28.

Aspect 31: A non-transitory computer-readable medium storing computer-executable code, comprising code for causing an apparatus to perform any one of aspects 21 through 28.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as LTE, the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in any of FIGS. 1, 2, 5, 6, 9, and 10 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method for communication in a wireless communication network at a user equipment, the method comprising:
   communicating with a base station in a full duplex mode configured for concurrent transmission and reception within an overlapping bandwidth;
   for each of one or more uplink beams, obtaining beam quality measurements, each corresponding to a respective downlink beam of a plurality of downlink beams;
   for each of the one or more uplink beams, identifying a set of usable downlink beams of the plurality of downlink beams based on the beam quality measurements;
   transmitting a report to the base station indicating the set of usable downlink beams for at least one uplink beam of the one or more uplink beams;
   identifying a selected uplink beam of the one or more uplink beams; and
   receiving a downlink signal from the base station on a usable downlink beam within the set of usable downlink beams corresponding to the selected uplink beam.

2. The method of claim 1, further comprising:
   selecting the plurality of downlink beams from a set of configured downlink beams configured by the base station for communication with the user equipment.

3. The method of claim 2, wherein selecting the plurality of downlink beams further comprises:
   selecting the plurality of downlink beams from a set of activated downlink beams within the set of configured downlink beams activated by the base station for communication with the user equipment.

4. The method of claim 3, wherein selecting the plurality of downlink beams further comprises:
   selecting a subset of the set of activated downlink beams as the plurality of downlink beams.

5. The method of claim 3, wherein selecting the plurality of downlink beams further comprises:
   selecting a subset of the set of configured downlink beams as the plurality of downlink beams.

6. The method of claim 1, further comprising:
   identifying the plurality of downlink beams based on respective quasi co-location information indicating a respective spatial property for each of the plurality of downlink beams.

7. The method of claim 6, wherein transmitting the report further comprises:
   transmitting the report comprising the respective quasi co-location information or a respective transmission configuration indication state for each of the respective downlink beams within the set of usable downlink beams for the at least one uplink beam.

8. The method of claim 6, wherein the spatial property comprises at least one of a beam direction, a beam width, or an associated downlink reference signal.

9. The method of claim 1, further comprising:
   for each of the one or more uplink beams, identifying a set of non-usable downlink beams of the plurality of downlink beams based on the beam quality measurements, wherein the set of usable downlink beams and the set of non-usable downlink beams are non-overlapping.

10. The method of claim 9, wherein transmitting the report further comprises:
    transmitting the report indicating the set of usable downlink beams and the set of non-usable downlink beams of the plurality of downlink beams for each of the one or more uplink beams.

11. The method of claim 1, wherein for each of the one or more uplink beams, identifying the set of usable downlink beams further comprises:
    comparing the beam quality measurements associated with each of the plurality of downlink beams to a threshold; and
    identifying the set of usable downlink beams for which respective beam quality measurements exceed the threshold.

12. The method of claim 11, wherein for each of the one or more uplink beams, identifying the set of usable downlink beams further comprises:
    identifying the set of usable downlink beams for which the respective beam quality measurements exceed the threshold over a duration of time.

13. The method of claim 11, wherein the threshold comprises a first threshold and further comprising:
    comparing the beam quality measurements associated with each of the plurality of downlink beams to a second threshold;
    for each of the one or more uplink beams, identifying a set of non-usable downlink beams of the plurality of downlink beams for which respective beam quality measurements are less than the second threshold.

14. The method of claim 13, further comprising:
    receiving a threshold amount and a hysteresis value from the base station; and determining the first threshold and the second threshold based on the threshold amount and the hysteresis value.

15. The method of claim 1, wherein the beam quality measurements comprise at least one of reference signal received power (RSRP), reference signal received quality (RSRQ), received signal strength indicator (RSSI), and signal-to-interference-plus-noise ratio (SINR).

16. The method of claim 15, wherein the SINR comprises a self-interference contribution.

17. A scheduled entity in a wireless communication network, the scheduled entity comprising:
   a transceiver for wireless communication with a scheduling entity;
   memory; and
   one or more processors communicatively coupled to the transceiver and the memory, the one or more processors configured to:
      communicate with the scheduling entity in a full duplex mode configured for concurrent transmission and reception within an overlapping bandwidth;
      for each of one or more uplink beams, obtain beam quality measurements, each corresponding to a respective downlink beam of a plurality of downlink beams;
      for each of the one or more uplink beams, identify a set of usable downlink beams of the plurality of downlink beams based on the beam quality measurements;
      transmit a report to the scheduling entity indicating the set of usable downlink beams for at least one uplink beam of the one or more uplink beams via the transceiver;
      identify a selected uplink beam of the one or more uplink beams; and
      receive a downlink signal from the scheduling entity on a usable downlink beam within the set of usable downlink beams corresponding to the selected uplink beam.

18. The scheduled entity of claim 17, wherein the one or more processors are further configured to:
   for each of the one or more uplink beams, identify a set of non-usable downlink beams of the plurality of downlink beams based on the beam quality measurements, wherein the set of usable downlink beams and the set of non-usable downlink beams are non-overlapping.

19. The scheduled entity of claim 17, wherein the one or more processors are further configured to:
   select the plurality of downlink beams from a set of configured downlink beams configured by the scheduling entity for communication with the scheduled entity.

20. A scheduling entity in a wireless communication network, the scheduling entity comprising:
   a transceiver for wireless communication with a scheduled entity;
   memory; and
   one or more processors communicatively coupled to the transceiver and the memory, the one or more processors configured to:
      communicate with the scheduled entity in a full duplex mode configured for concurrent transmission and reception within an overlapping bandwidth;
      transmit on a plurality of downlink beams to the scheduled entity via the transceiver to facilitate beam quality measurements on each of the plurality of downlink beams for each of one or more uplink beams;
      receive a report from the scheduled entity, wherein the report comprises a set of usable downlink beams of the plurality of downlink beams for at least one uplink beam of the one or more uplink beams based on the beam quality measurements;
      identify a selected uplink beam of the one or more uplink beams; and
      transmit a downlink signal to the scheduled entity on a usable downlink beam within the set of usable downlink beams corresponding to the selected uplink beam via the transceiver.

21. The scheduling entity of claim 20, wherein the report comprises respective quasi co-location information or a respective transmission configuration indication state, each indicating a respective spatial property for each respective downlink beam within the set of usable downlink beams for the at least one uplink beam.

22. A method for communication in a wireless communication network at a base station, the method comprising:
   communicating with a user equipment (UE) in a full duplex mode configured for concurrent transmission and reception within an overlapping bandwidth;
   transmitting on a plurality of downlink beams to the UE to facilitate beam quality measurements on each of the plurality of downlink beams for each of one or more uplink beams;
   receiving a report from the UE, wherein the report indicates a set of usable downlink beams of the plurality of downlink beams for at least one uplink beam of the one or more uplink beams based on the beam quality measurements;
   identifying a selected uplink beam of the one or more uplink beams; and
   transmitting a downlink signal to the UE on a usable downlink beam within the set of usable downlink beams corresponding to the selected uplink beam.

23. The method of claim 22, wherein the plurality of downlink beams comprise a set of configured downlink beams configured by the base station for communication with the UE.

24. The method of claim 23, wherein the plurality of downlink beams comprise a set of activated downlink beams within the set of configured downlink beams activated by the base station for communication with the UE.

25. The method of claim 22, wherein receiving the report further comprises:
   receiving the report comprising respective quasi co-location information or a respective transmission configuration indication state, each indicating a respective spatial property for each respective downlink beam within the set of usable downlink beams for the at least one uplink beam.

26. The method of claim 25, wherein the spatial property comprises at least one of a beam direction, a beam width, or an associated downlink reference signal.

27. The method of claim 22, wherein receiving the report further comprises:
   receiving the report indicating the set of usable downlink beams and a respective set of non-usable downlink beams of the plurality of downlink beams for the at least one uplink beam, wherein the set of usable downlink beams and the set of non-usable downlink beams are non-overlapping.

28. The method of claim 22, further comprising:
   transmitting a threshold amount and a hysteresis value to the UE for use by the UE in determining at least one threshold associated with the beam quality measurements obtained on each of the plurality of downlink beams for each of the one or more uplink beams.

29. The method of claim 22, wherein transmitting on the plurality of downlink beams further comprises:
   transmitting downlink reference signals on each of the plurality of downlink beams.

\* \* \* \* \*